United States Patent [19]

Morito et al.

[11] Patent Number: 4,868,879
[45] Date of Patent: Sep. 19, 1989

[54] APPARATUS AND METHOD FOR RECOGNIZING SPEECH

[75] Inventors: Makoto Morito; Masao Takeuchi; Akihiko Fujisawa; Yukio Tabei; Keiko Takahashi, all of Tokyo, Japan

[73] Assignee: Oki Electric Industry Co., Ltd., Tokyo, Japan

[21] Appl. No.: 716,154

[22] Filed: Mar. 26, 1985

[30] Foreign Application Priority Data

| Mar. 27, 1984 | [JP] | Japan | 59-57280 |
| Mar. 28, 1984 | [JP] | Japan | 59-58437 |
| Mar. 28, 1984 | [JP] | Japan | 59-48435 |
| Mar. 28, 1984 | [JP] | Japan | 59-58438 |
| Jan. 24, 1985 | [JP] | Japan | 60-9862 |

[51] Int. Cl.[4] .......................... G10L 5/00; G10L 1/06; G06F 15/34
[52] U.S. Cl. .................................... 381/43; 364/513.5
[58] Field of Search .............................. 381/43, 41, 42; 364/513.5

[56] References Cited

U.S. PATENT DOCUMENTS

| 4,038,503 | 7/1977 | Moshier | 381/43 |
| 4,059,725 | 11/1977 | Sakoe | 381/43 |
| 4,256,924 | 3/1981 | Sakoe | 381/43 |
| 4,282,403 | 8/1981 | Sakoe | 381/43 |
| 4,384,273 | 5/1983 | Aokland et al. | 381/43 |
| 4,481,593 | 11/1984 | Bahler | 381/43 |
| 4,571,697 | 2/1986 | Watanabe | 381/43 |
| 4,624,008 | 11/1986 | Vensko et al. | 381/43 |
| 4,624,010 | 11/1986 | Takeboyashi | 381/43 |
| 4,677,672 | 6/1987 | Ukita et al. | 381/43 |

OTHER PUBLICATIONS

The Journal of the Acoustical Society of America: Program of the 104th Meeting. Supplement 1, vol. 72, Fall 1982. Published by the American Institute of Physics for the Acoustical Society of America.

"A Single-Chip Speaker Independent Voice Recognition System", Makoto Morito, Kozo Yamada, Akihkio Fujisawa & Masao Takeuchi; ICASSP 86, Tokyo; copyright 1986 IEEE; Reprinted from Proceedings of IEEE-IECEJ-ASJ International Conference on Acoustics, Speech, and Signal Processing, Apr. 7-11, 1986.

Primary Examiner—Emanuel S. Kemeny
Assistant Examiner—Christopher H. Lynt
Attorney, Agent, or Firm—Wenderoth, Lind & Ponack

[57] ABSTRACT

In a speech recognition system for effecting substantially linear matching, a start point of an input speech pattern is detected to start counting the frames of the input speech pattern for updating a speech frame number. Each time the speech frame number is updated, a plurality of frame numbers of reference templates are generated in substantially a linear relationship to the frame number, thus providing a plurality of matching paths between each of the reference templates and the input speech pattern. The distance between the input pattern data and the reference template data between the corresponding frames specified by each matching path is calculated each time the speech frame number is updated. An accumulated value of the distances along a matching path from the start point of the input speech until a desired speech frame is regarded as a dissimilarity, and the dissimilarity corresponding to each matching path in each reference template is calculated each time the speech frame is updated. The number of the reference template which gives a minimum dissimilarity is detected and stored. At the time of confirming an end of the input speech, the number of the reference template with the minimum dissimilarity is determined to be the recognized result of input speech.

14 Claims, 21 Drawing Sheets

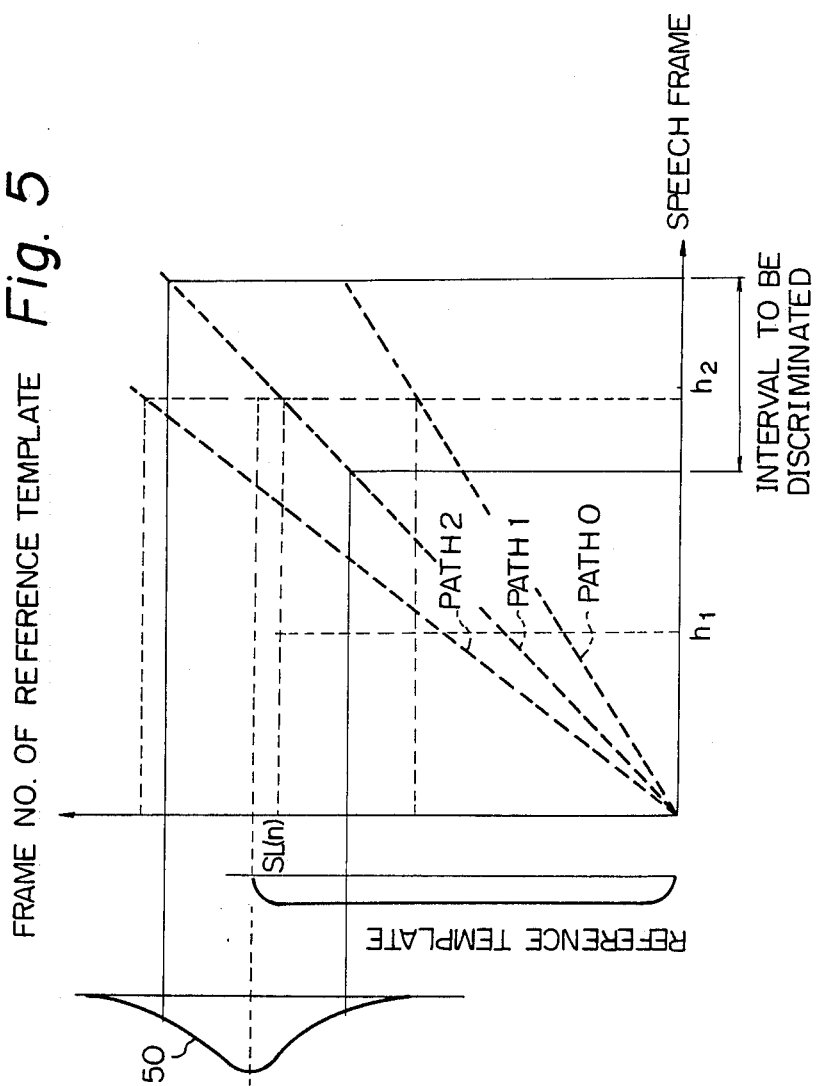

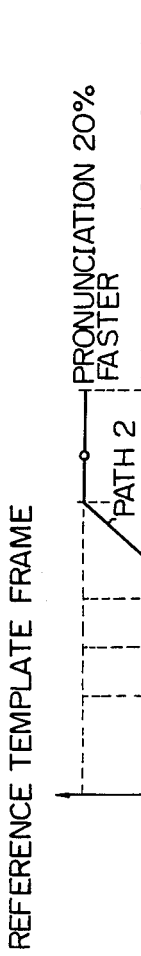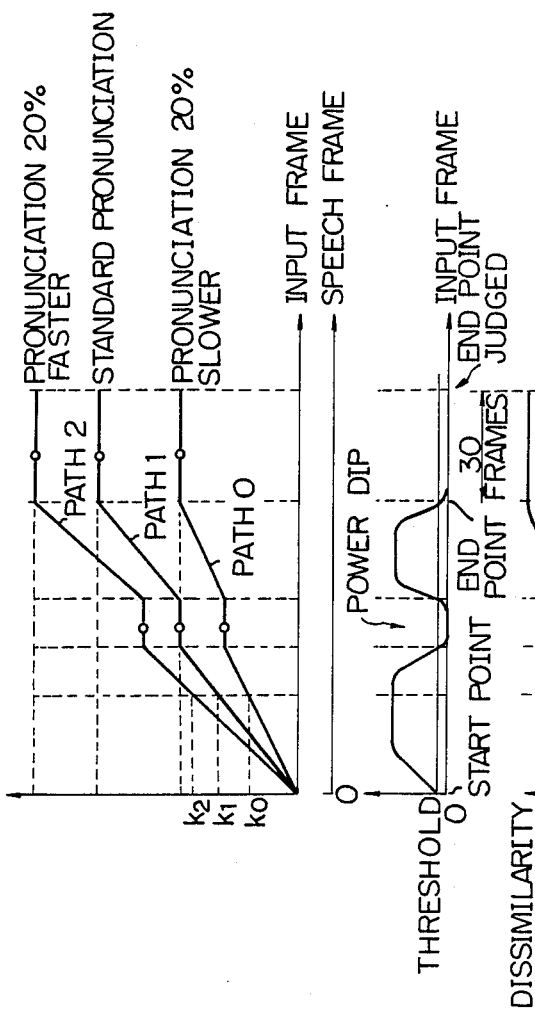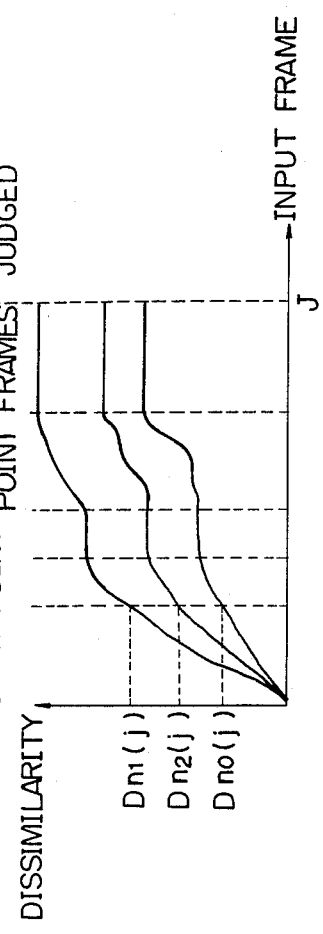
Fig. 6a
Fig. 6b
Fig. 6c

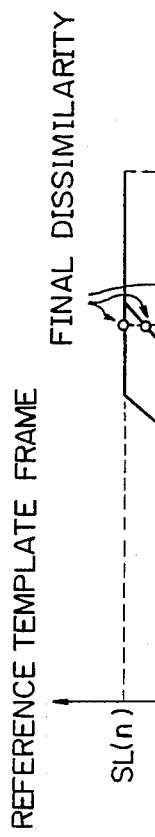
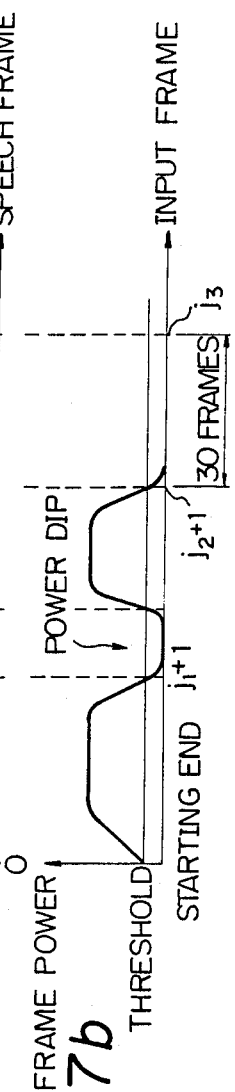
Fig. 7a
Fig. 7b

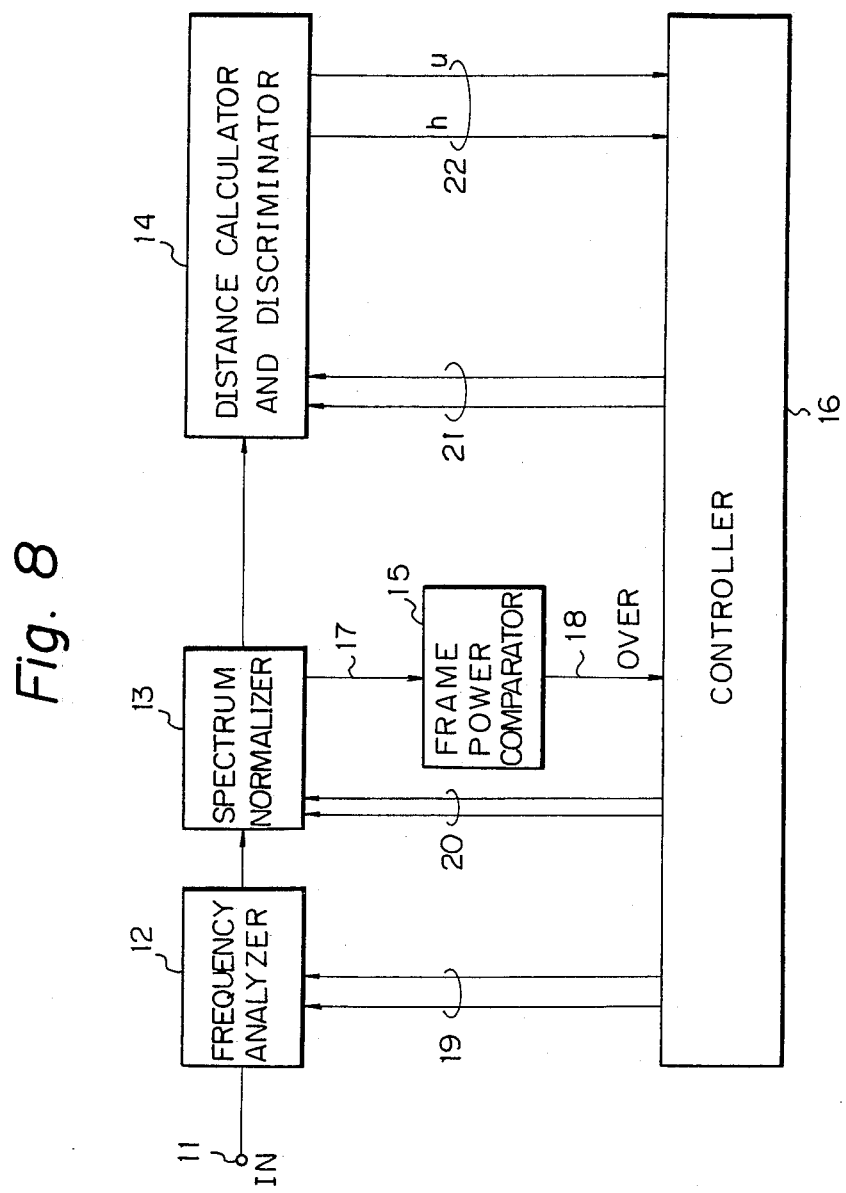

NOTE: THE NUMBERS IN CIRCLES INDICATE STATE NUMBERS

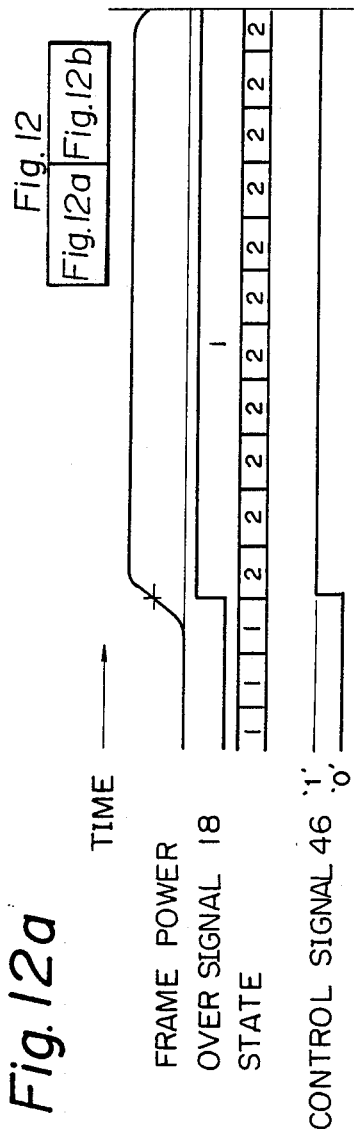

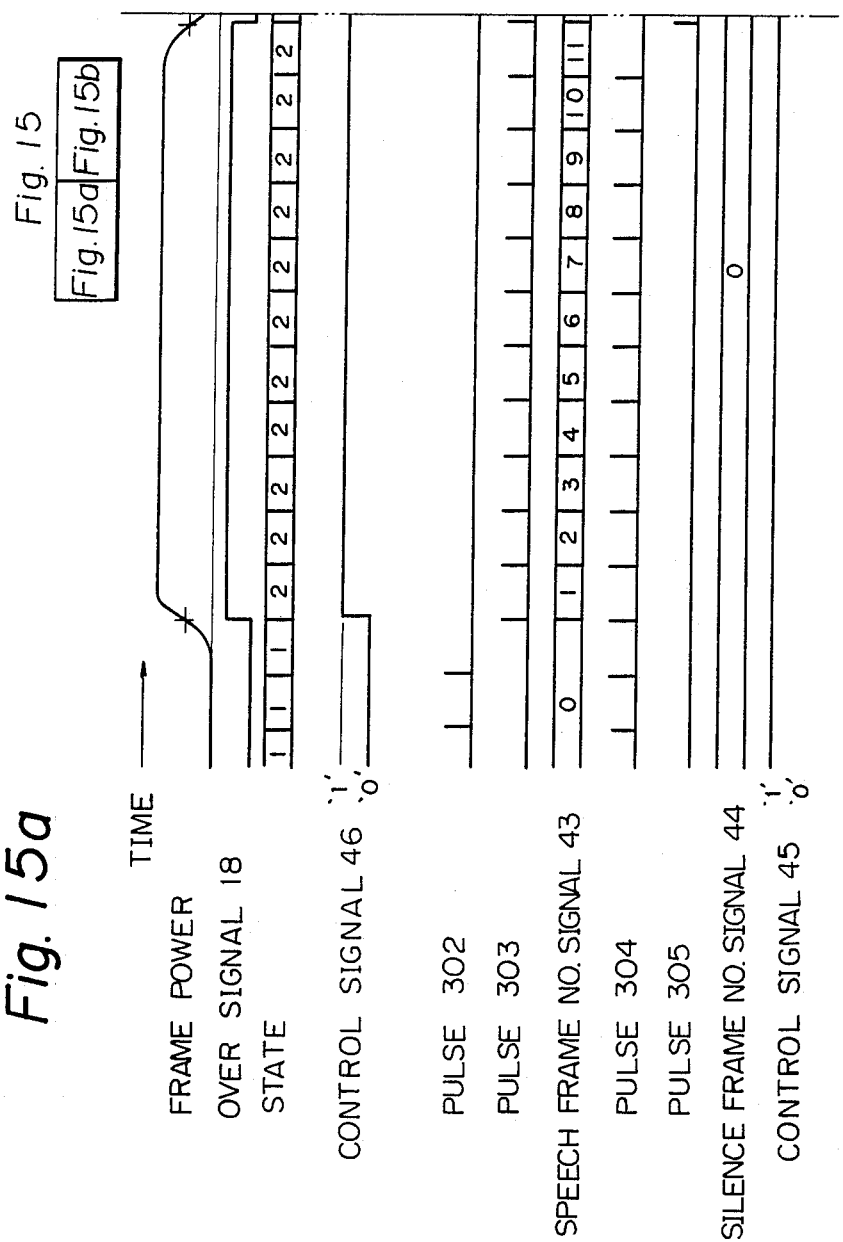

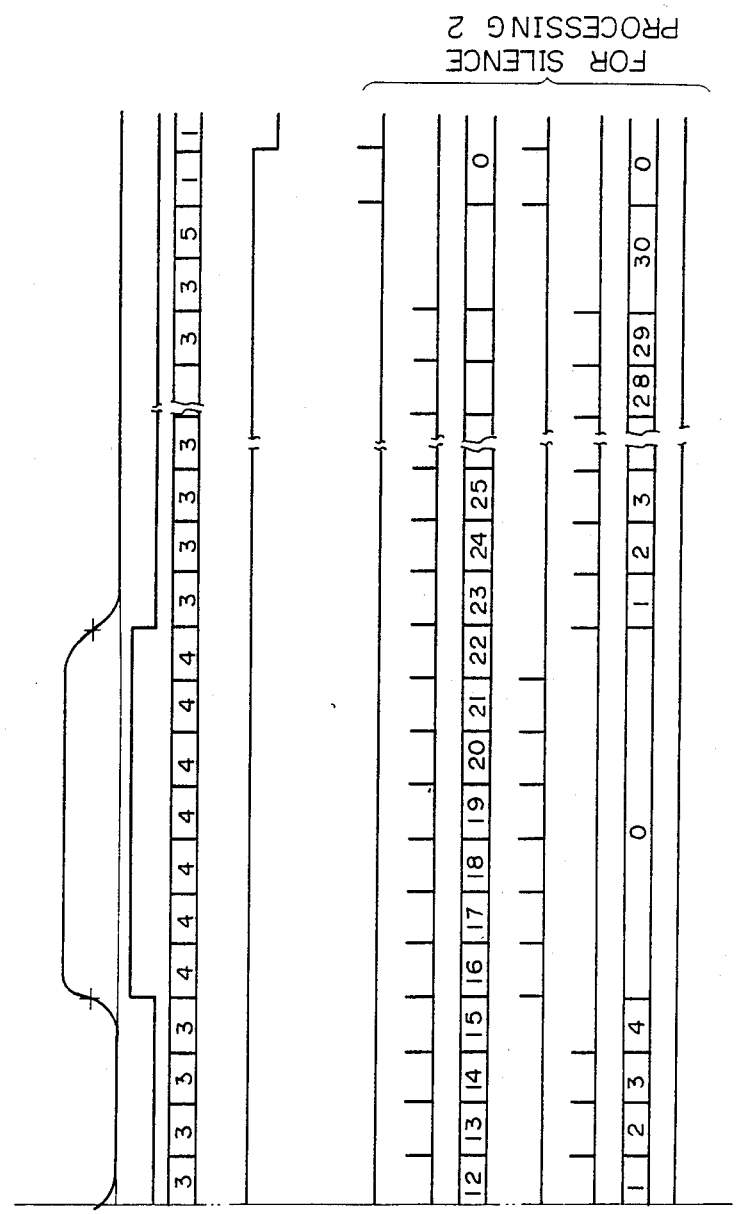

APPARATUS AND METHOD FOR RECOGNIZING SPEECH

BACKGROUND OF THE INVENTION

The present invention relates to an apparatus and a method for recognizing speech, and more particularly to a speech recognition apparatus and method for starting, on a real-time basis, recognizing input speed immediately after the point in time at which the input speed is first detected, but before the point in time at which the end of the input speed is confirmed.

In general, a speech sound has different lengths each time it is uttered. The speech length is not linearly varied as a whole since the length of vowels is especially variable. FIG. 1 of the accompanying drawings shows the different sound lengths of various words. The pronounced words in FIG. 1 include the English words "ON", "OFF", "START", and "STOP", and Japanese words "HAI", "UE", and "SHITA".

As is apparent from FIG. 1, the pronounced words have largely different lengths which vary from individual to individual or dependent on the psychological condition of a speaker. Even when the speaker feels that he is pronouncing words in a standard manner, the pronounced word length varies in the range of from 20% to 40%. Therefore, some measure should be taken to achieve good speech recognition of words having such different pronounced word lengths.

To cope with the above varying pronounced word lengths, there is one known speech recognition method in which reference templates are stored as time series for a frequency component with respect to each of respective reference speech sounds, an input pattern is extracted from input speech as a time series for the same frequency component, the accumulated difference (hereinafter referred to as "dissimilarity") between the input pattern and each of the reference template is calculated, and the input speech is recognized based on the calculated dissimilarity. In the above method, each of the reference templates or the input speech pattern is normally produced by effecting a frequency analysis in regularly established frames, normalizing the length of a vocal tract using logarithmic conversion and a least square fit approximation line, and expressing the template or pattern as a time series for a frequency component.

Methods of establishing matching paths for calculating the dissimilarity between an input speech pattern and each reference template include a DP matching method using a dynamic programming method and a linear matching method. The DP matching method has an increased matching accuracy, but requires many calculations which, if carried out by a hardware design, results in the use of many gates. The linear matching method is relatively effective for recognizing words having short syllables. Although the linear matching method requires less calculations than the DP matching method, it requires at least a memory for storing information on a speech sound from its start point to the end point. It has been difficult to implement the linear matching method with an apparatus having a limited circuit arrangement.

SUMMARY OF THE INVENTION

It is an object of the present invention to provide an apparatus and a method for quickly recognizing speech by starting a speech recognizing operation immediately after a start point of input speech is detected.

Another object of the present invention is to provide a speech recognition apparatus and method which require a reduced memory capacity for storing input speech data by starting a speech recognizing operation immediately after a start point of input speech is detected.

Still another object of the present invention is to provide a speech recognition apparatus and method capable of matching by varying input speech sound lengths by providing a plurality of essentially linear matching paths in recognition of such varying input speech sound lengths.

According to the present invention, there is provided an apparatus for recognizing speech, comprising a means for analyzing the frequencies of input speech to extract an input pattern composed of frame time series information of frequency components in a plurality of channels; a means for spectrally normalizing data of said input pattern in each of the channels in each frame to generate spectrally normalized data $W(i,j)$; a means for detecting start and end points and a speech sound condition of the input speech based on said spectrally normalized data, and a distance calculating and discriminating means comprising a reference template memory for storing a plurality of reference templates composed of spectrally normalized data $Sn(i,kp)$ in plural frames and plural channels which are produced by analyzing frequencies of a plurality of predetermined reference speech samples and spectrally normalizing them, an input pattern memory for storing the spectrally normalized data $W(i,j)$ in all of the channels for one frame of the input pattern, issued from said spectrally normalizing means; a means for starting the counting the frames of the input pattern after the start point of the input speech is detected, for successively updating a speech frame number while the input speech is in the speech sound condition, and for stopping the updating of said speech frame number while the input speech is in a silent condition, and for restarting so as to update said speech frame number when the input speech again is in the speech sound condition before the end point of the input speech has been detected; a means for generating a plurality of frame numbers of the reference templates in essentially linear relation to said speech frame number in order to establish a plurality of matching paths between each of said reference templates and said input pattern each time said speech frame number is updated; a means for calculating the distance between the spectrally normalized data $W(i,j)$ of said input pattern and the spectrally normalized data $Sn(i,kp)$ of said reference templates in each of said channels between the corresponding frames identified by said matching paths each time said speech frame number is updated; a means for calculating and storing a dissimilarity corresponding to each of the matching paths for each of the reference templates by regarding an accomultated value of said distances along said matching paths of desired said speech frame number as a dissimilarity, and by adding and temporarily storing an immediately prior dissimilarity and the distance in the present speech frame number each time the speech frame number is updated, from the start point of the input speech, and a means for detecting a minimum dissimilarity and storing the number of the reference template corresponding to said minimum dissimilarity, whereby the number of said reference template corresponding to said minimum dissimilarity stored correspondingly to the speech frame number at the end point of the input speech at the time said end point is detected is determined as the recognized result of input speech.

According to the present invention, there is also provided a method of recognizing speech, comprising the steps of providing a plurality of reference templates composed of spectrally normalized data in a plurality of frames and a plurality of channels; analyzing the frequencies of input speech to extract an input pattern composed of frame time series information of frequency components in the channels; normalizing spectral data of said input pattern in each of the channels in each frame to generate spectrally normalized data starting the counting of the frames of the input pattern after a start point of the input speech is detected, for successively undating a speech frame number while the input speech is in a speech sound condition, and for stopping the updating of said speech frame number while the input speech is in a silent condition, and for restarting so as to update said speech frame number when the input speech is in the speech sound condition again before an end point of the input speech has been detected; generating a plurality of frame numbers of the reference templates in an essentially linear relationship to said speech frame number in order to establish a plurality of matching paths between each of said reference templates and said input pattern each time said speech frame number is updated, calculating the distance between the spectrally normalized data of said input pattern and the spectrally normalized data of said reference templates in each of said channels between the corresponding frames identified by said matching paths each time said speech frame number is updated, storing a dissimilarity corresponding to each of the matching paths for each of the reference templates by regarding an accumulated value of said distances along said matching paths of desired said speech frame number as a dissimilarity, and by adding and temporarily storing an immediately prior dissimilarity and the distance in the present speech frame number each time the speech frame number is updated, from the start point of the input speech, detecting a minimum dissimilarity and storing the number of the reference template corresponding to said minimum dissimilarity, and determining the number of said reference template corresponding to said minimum dissimilarity stored correspondingly to the speech frame number at the finishing end of the input speech at the time said finishing end has been detected, as recognized input speech.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a diagram showing path selection in discrimination processing 4 of the speech recognition method;

FIG. 6a is a diagram showing a plurality of matching paths in silence processing 1 of the speech recognition method;

FIG. 6b is a diagram showing the frame power of an input pattern in the silence processing 1;

FIG. 6c is a diagram showing dissimilarities in matching paths for the matching between the input pattern and the reference template in the silence processing 1 of the speech recognition method;

FIG. 7a is a diagram showing a plurality of matching paths in silence processing 2 of the speech recognition method;

FIG. 7b is a diagram showing the frame power of an input pattern in the silence processing 2;

FIG. 8 is a block diagram of a speech recognition apparatus according to the first through third embodiments of the present invention;

FIG. 15, consisting of FIGS. 15a and 15b, is a timing chart of signals produced in the speech recognition apparatus of the third embodiment, from the time when a start point of input speech has been detected to the time when an end point thereof has been detected.

DETAILED DESCRIPTION

Speech recognition apparatus and method according to the present invention operate in the following processing modes:
Start point detecting processing;
Speech sound processing;
Silence processing;
Speech sound processing after a power dip; and
End point processing
Start point detecting processing A speech sound can be detected by a method using speech power. A start point of speech is regarded as occurring when a frame power P(j) (j is an input frame number) exceeds a predetermined threshold value. There may however be an instance wherein the frame power P(j) exceeds the threshold value so as to a false start point detection due to noise even when there is no input speech. To avoid this problem, if the frame power does not exceed the threshold for three successive frames, the input frame is not regarded as a start point of speech, and the recognition process is interrupted and the operation returns to the start point detecting processing. The frame length is assumed here to be 16 msec.

Speech sound processing
[Matching path]

The numbering of a frame in which the frame power exceeds the threshold from the start point of speech is defined such that it is referred to as an "hth speech frame" which is differentiated from simple input frame numbers. The speech frame having a speech frame number h corresponds to an hth input frame in a speech sound interval.

If matching processing for normalizing a speech speed is started from the start point of speech and can be carried out in each period (frame period) at which a speech analyzer produces an output, then it is not necessary to store all data of the speech analyzer from the start point of the speech, and the response time is shortened.

According to the present invention, matching paths are set for a slow speech sound, a standard speech sound, and a fast speech sound, and the matching processing is carried out in each of the matching paths. At the start point of a word, the speech of pronunciation of the word which is about to be entered is not known. Therefore, the matching paths are set for the slow speech sound, the standard speech sound, and the fast speech sound, and the matching processing is effected in each matching path, so that the matching processing can be started even before the end point of the speech has been detected.

Figure 2A:
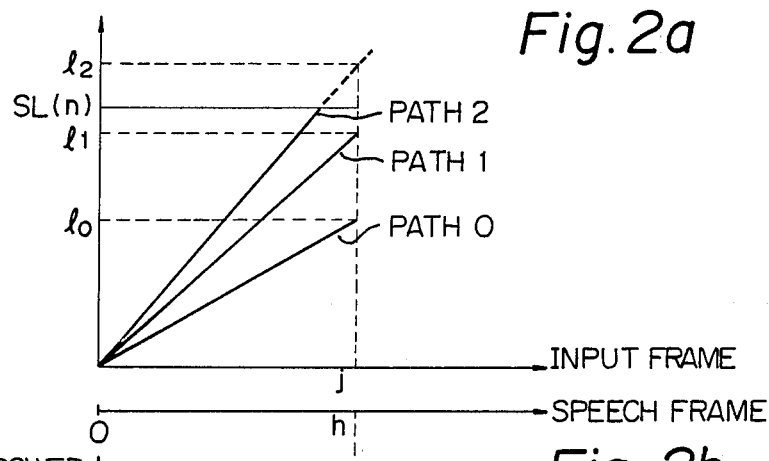
FIG. 2a is a diagram of a plurality of matching paths for effecting matching between an input speech pattern and a reference template according to a speech recognition method of the present invention.
Figure 2B:
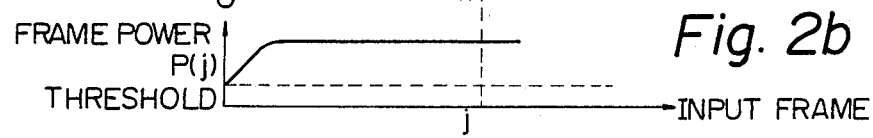
FIG. 2b is a diagram showing the frame power of an input pattern.
Figure 2C:
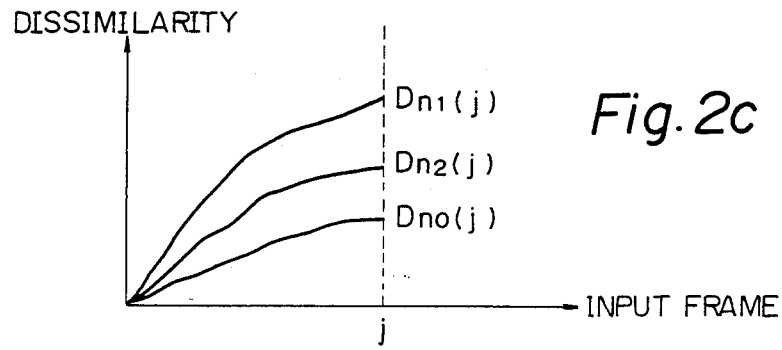
FIG. 2c is a diagram showing dissimilarities Dnp(j) in matching paths for the matching between the input pattern and the reference template in the speech recognition method.

FIG. 2a shows a plurality of matching paths for effecting matching between an input pattern and reference templates according to a speech recognition method of the present invention, FIG. 2b is illustrative of a frame power of an input pattern, and FIG. 2c shows dissimilarities Dn0(j), Dn1(j), and Dn2(j) in the matching paths between the input pattern and the reference template. The FIGS. 2a through 2c have horizontal axes which correspond to each other.

In FIG. 2a, the speech speed is regarded as varying in a range of ±20%, with three matching paths set. The horizontal axis of FIG. 2a is indicative of input pattern frame numbers and the vertical axis thereof is indicative of reference template frame numbers. The nth reference template Sn is given by way of example, with its frame length being SL(n). A matching path 0 is set for speech sounds which are pronounced 20% slower. A matching path 1 is set for standard speech sounds. A matching path 2 is set for speech sounds which are pronounced 20% faster.

Frame numbers corresponding to the paths with respect to the hth speech frame are referred to as "path-related frame numbers". In particular, path-related frame numbers corresponding to the path (p=0, 1, 2) are referred to as "path-p-related frame members", and expressed by the following equations:

The path-0-related frame number l0:

$$l0 = \left[ \frac{1}{1.2} h \right] \quad (1)$$

The path-1-related frame number l1:

$$l1 = h \quad (2)$$

The path-2-related frame number l2:

$$l2 = \left[ \frac{1}{0.8} h \right] \quad (3)$$

where [] respresents Gauss' symbol.

[Distance calculation]

The distance dnp(i,j) in each path between jth input frame and the reference template Sn is given by the following equation:

$$dnp(i,j) = |W(i,j) - Sn(i,kp)| \quad (4)$$

where p is the path number, W(i,j) is the data of an input pattern with the input frame number j and the channel number i (i=0 through 7), kp is the reference template frame number, Sn(i,kp) is the reference template data, and $$kp = \begin{cases} lp & lp \leq SL(n) \\ SL(n) & lp > SL(n) \end{cases}$$

According to the above equation (4), the distance between the data of the jth input speech frame of the input pattern and the data of the kpth frame of the reference template is calculated in the path p. The path-related frame number p is limited to the reference template length SL(n).

[Dissimilarity]

The dissimilarity Dnp(j) from the start point to the jth input frame of the input pattern is calculated according to the following equation (5):

$$Dnp(j) = Dnp(j-1) + \sum_{i=0}^{7} dnp(i,j) \quad (5)$$

The dissimilarity of the jth frame in each path is calculated by adding the distance (for example, |W(i,j)−Sn(i,kp)|) in each channel to the dissimilarity (for example, Dnp(j−1) with respect to the (j−1)th frame per channel. These calculations are carried out when an output of the jth frame is applied. In the calculation of the dissimilarity with respect to the jth frame, only the input pattern data of the jth frame, the data of the reference pattern corresponding to the respective paths, and the dissimilarity data of the (j−1)th frame which is one frame earlier than the jth frame are necessary; therefore, the input pattern data which is earlier than the jth frame by two frames or more is not necessary. Therefore, the speech recognition method of the invention is advantageous in that it requires a smaller memory area than the conventional linear matching method which has to stoe input patterns until an end point has been detected.

[Discrimination processing]

At the jth input speech frame, the dissimilarity Dnp(j) with respect to the jth frame from the start point has been calculated. The discrimination processing is carried out using this dissimilarity.

It is important for better speech recognition to effect the discrimination processing strictly. However, strict discrimination processing complicates the circuit arrangement.

According to the present invention, the following four methods (discrimination processing 1 through discrimination processing 4) are given in the order of strictness of the discrimination processing, and one of the four methods is selected in an actual application:

(Discrimination processing 1)

A category corresponding to a reference template which gives a minimum value to the dissimilarity Dnp(j) (n=0 through N−1, p=0,1,2) from the start point to the jth input frame is regarded as a discriminated result.

Each of the paths in which matching has been carried out is a path with an end point thereof predicted. The dissimilarity in a path in which the end point of input speech does not coincide with that of the reference template may be a large value, and the dissimilarity in a path with a higher degree of coincidence of the end points may be a small value. Therefore, sufficient speech recognition results can be obtained by the discrimination processing 1 which employs a simple process for searching for a minimum value.

(Discrimination processing 2)

Figure 3A:
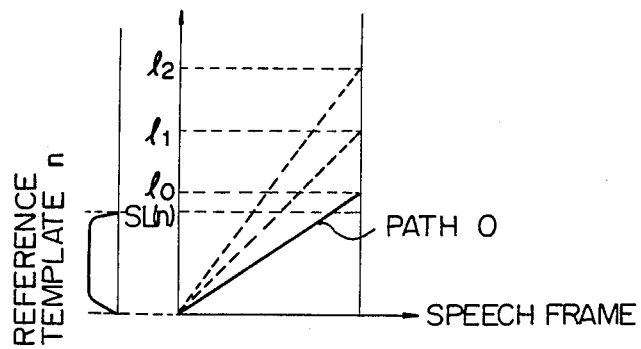
FIGS. 3a through 3c are diagrams showing path selection in discrimination processing 2 of the speech recognition method.
Figure 3B:
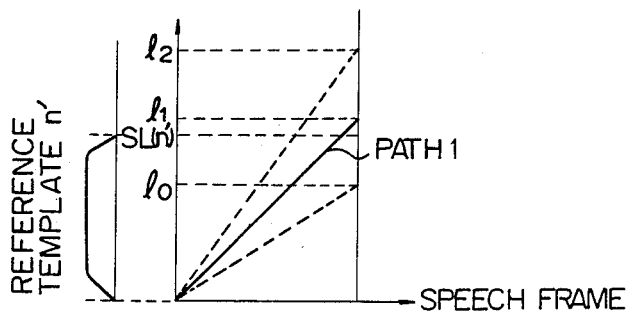
Figure 3C:
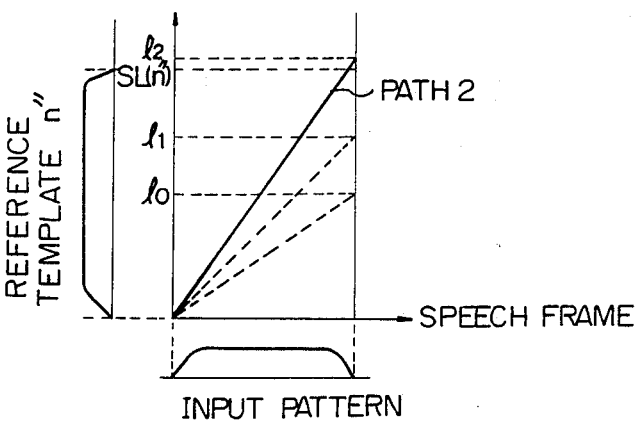

To allow matching processing prior to the detection of an end point, the dissimilarity is determined in each of a plurality of paths set for each of slow, standard, and fast speech sounds. The paths are assumed paths because the end point of speech sounds are unknown. For discrimation processing, therefore, one of the paths is selected in which the end points of the input speech and the reference template have a high degree of coincidence. In the selection of the path, the reference template length SL(n) and the path-related frame number lp are compared, and the path number P which gives the path-related frame number lp which is the closest to SL(n) is selected. FIG. 3a shows the manner in which the path 0 (indicated by the solid line) is selected by matching with respect to a nth reference template shorter than the input pattern. FIG. 3b shows the manner in which the path 1 (indicated by the solid line) is selected by matching with respect to a n'th reference template of about the same length as that of the input pattern. FIG. 3c illustrates the manner in which the path 2 (indicated by the solid line) is selected by matching with respect to a n'th reference template longer than the input pattern.

The dissimilarities Dnp(j) between input pattern and N reference templates are calculated in the selected path. The category of the reference template giving a minimum value of the dissimilarities Dnp(j) in the selected path is regarded as a recognized result.

(Discrimination processing 3)

Figure 4:
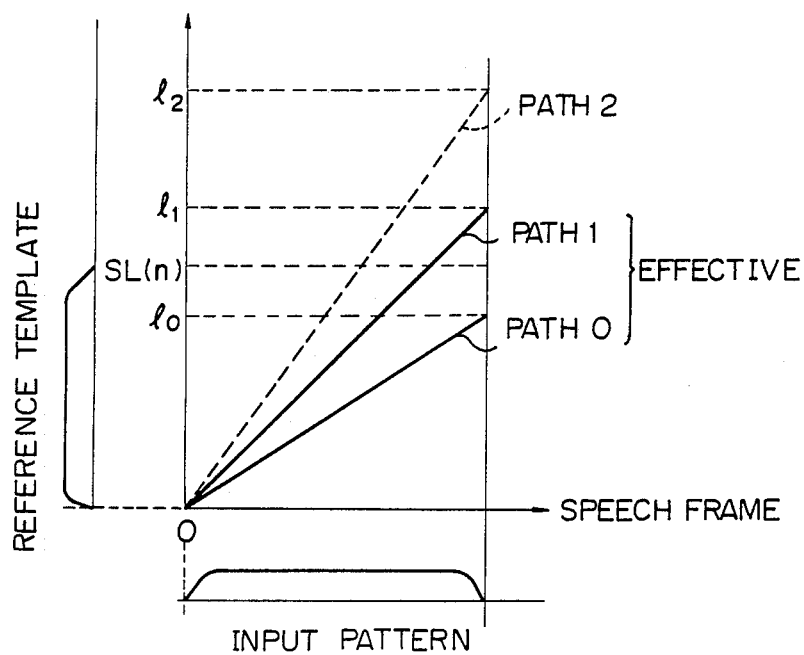
FIG. 4 is a diagram showing path selection in discrimination processing 3 of the speech recognition method.

In the discrimination processing 2, the path in which the reference template length SL(n) and the path-related frame lp coincide with each other to a largest degree is selected at a first stage. However, there is an occasion in which such a path cannot be selected easily, as shown in FIG. 4. When this happens, both paths (indicated by the solid lines) are regarded as effective, and the category of the reference template giving a minimum value of the dissimilarities Dnp(j) in the effective paths is regarded as a recognized result.

(Discrimination processing 4)

Some words to be recognized have very different lengths. For example, the words "STOP" and "START" in FIG. 1 have lengths which are widely different from those of the other words. Where the speech frame length is 37 or greater, for example only the words "STOP" and "START" are determined to be recognized, and where the speech frame length is smaller than 37, the other words are determined to be recognized. By thus reducing the number of words to be recognized, the rate of speech recognition can be increased.

Figure 1:
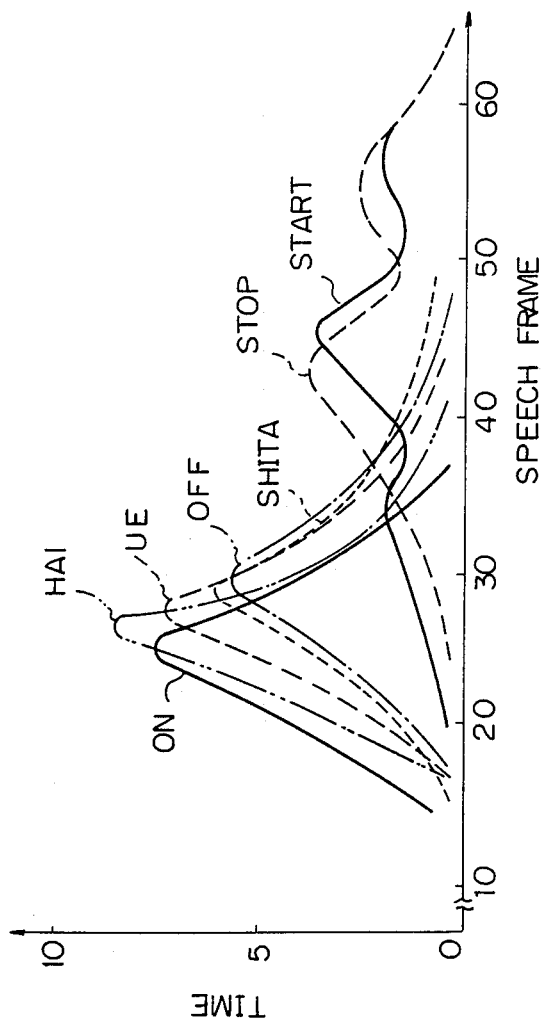
FIG. 1 is a diagram showing the varying speech sound lengths of various words.

Although the distribution of pronounced word lengths is spread to a certain extent, as shown in FIG. 1, it can be said that they are concentrated in a localized area. The speech frame numbers in the concentrated word length area are referred to as an "interval to be discriminated". When a speech frame number falls in the interval to be discriminated, a path is selected according to the discrimination processing 3, and when no speech frame number falls in the interval to be discriminated, no path is selected.

FIG. 5 shows the relationship between the interval to be discriminated and speech frame numbers. The vertical axis of FIG. 5 indicates reference template frame numbers while the horizontal axis thereof speech frame numbers. Designated at numeral 50 of FIG. 5 is a distribution of speech lengths of words expressed by the reference template. If the speech frame number is h1 in FIG. 5, then it is outside of the interval to be discriminated, and no path is selected. If the speech frame number is h2, then it is in the interval to be discriminated, and the path 1 is selected in the same manner as the discrimination processing 3. Then, the category of the reference template giving a minimum value of the dissimilarities Dnp(j) in the selected path is regarded as a recognized result.

Silence processing

The point where the frame power is reduced below the threshold tends to be regarded as an end point of speech. However, some words have portions in which the frame power is below the threshold, such as between "i" and "chi" of the word "ichi". The end point such words cannot be judged simply by ascertaining whether or not the frame power is below the threshold. The above portions are called a "power dip". The length of the power dip varies accordingly to the words, but seldom exceeds the length of 30 frames. When the frame power becomes smaller than the threshold in a certain frame time point after a start point of speech has been detected, it is difficult to determine whether that frame time point is at the beginning of a power dip or the end of the word. Such a determination is normally effected by ascertaining whether an interval (referred to as a "silence frame number" and indicated by u) in which the frame power is below the threshold extends over 30 frames or not. Therefore, the determination can be made only after 30 frames have passed after the frame power has become smaller than the threshold. As a consequence, the result obtained when the frame power is smaller than the threshold has to be stored in some way until the end point of speech has been determined. This can be carried out by the following three processing methods (silence processing 1 through silence processing 3):

(Silence processing 1)

According to the first processing method (silence processing 1), when the frame power becomes lower than the threshold, the updating of the speech frame numbers is stopped, and the distance is forcibly brought to 0 to stop the addition of the dissimilarity. More specifically, in a silent condition, the distance expressed by the equation (4) is forcibly altered to the following equation (6):

$$dnp(i,j)=0 \qquad (6)$$

Thus, the dissimilarity at the time when the frame power is below the threshold is not added in reality. The reference templates are made in the form in which the frame corresponding to the power dips are removed.

Although the distance is regarded as 0 in a power dip, essentially linear matching is effected according to the present invention.

Paths in the silence processing 1 are illustrated in FIG. 6a. FIG. 6b shows an example of frame power. FIG. 6c shows the dissimilarities in the respective matching paths. FIGS. 6a through 6c have horizontal axes corresponding to each other.

(Silence processing 2)

The second processing method (silence processing 2) continues up to the dissimilarity processing in a frame in which the frame power becomes smaller than the threshold, but stops only the discrimination processing to thereby hold the recognized result.

FIG. 7a shows a plurality of matching paths for effecting matching between an input pattern and a reference template according to the speech recognition method employing the silence processing 2.

The horizontal axis of FIG. 7 indicates speech frame numbers j and the vertical axis thereof indicates reference template frame numbers. There are three matching paths set respectively for speech sounds pronounced 20% slower, speech sounds pronounced in a standard manner, and speech sounds pronounced 20% faster. FIG. 7b shows frame power corresponding to the speech frame number j of the input pattern.

Denoted in FIG. 7a at SL(n) is the frame length of a reference template having a reference template number n. Open circles in FIG. 7a represent positions in the paths in which the recognized results are held. In the silence processing 2, since the distance dnp(j) (p=0, 1, 2) is calculated even during a power dip, reference templates with power dips are prepared.

(Silence processing 3)

According to the third method (silence processing 3), in a frame in which the frame power is below the threshold, the category name of a reference template with a highest similarity obtained up to that frame is stored in a register, and the distance calculation and discrimination is continued even in the frame with the frame power below the threshold unless an end point of speech is detected.

Speech sound processing after a power dip

In the input pattern having a power dip, the frame power becomes greater than the threshold (in a speech sound condition) within 30 frames after the frame power has been reduced below the threshold. In this speech sound condition, the speech frame is updated, the distance is calculated, and the dissimilarity distance is calculated, in the same manner as that of the foregoing speech sound processing.

End point processing

A speech end point is detected when the frame power remains below the threshold for 30 successive frames. The actual speech end point is the last frame in which the frame power exceeds the threshold. At the time that the end point is thus determined, the discriminated result can be issued as the recognized result at the end point.

Input speech is processed in the foregoing manner according to the present invention.

FIG. 8 illustrates a block diagram of a speech recognition apparatus according to a first embodiment of the present invention. The speech recognition apparatus comprises a speech input terminal 11, a frequency analyzer 12, a spectrum normalizer 13, a distance calculator and discriminator 14, a speech frame power comparator 15, and a controller 16 comprising a microprocessor, for example. Element 17 is a frame power line; element 18 an OVER signal line indicating that the frame power exceeds a threshold; element 19 a control signal line which connects the controller 16 to the frequency analyzer 12; element 20 a control signal line which connects the controller 16 to the spectrum normalizer 13; element 21 a control signal line which connects the controller 16 to the distance calculator and discriminator 14, and element 22 a frame number signal line (indicating a speech sound frame number h and a silence frame number u) which connects the controller 16 to the distance calculator and discriminator 14.

An input speech signal, converted into an electrical electric signal, is applied through the speech input terminal 11 to the frequency analyzer 12. The frequency analyzer 12 comprises digital bandpass filters, for example, for analyzing the frequencies of the input speech signal and converting the same into data representative of a spectral intensity in each of eight frequency bands (hereinafter referred to as "channels"). The data analyzed by the frequency analyzer 12 is delivered to the spectrum normalizer 13, which normalizes sound source characteristics and speech sound intensities dependent on speakers. Then, the spectrum normalizer 13 issues spectrally normalized data to the distance calculator and discriminator 14. At the same time, the spectrum normalizer 13 calculates the frame power 17 which is an average of the outputs from the frequency analyzer 12 for the eight channels in a frame and feeds it to the speech frame power comparator 15.

The distance calculator and discriminator 14 stores N reference templates composed of reference template data as frame time series which have been frequency-analyzed and spectrally normalized. The distance calculator and discriminator 14 calculates the distances between the reference templates and the input speech pattern which has been spectrally normalized, and determines the category of a reference template which is closest to the input speech pattern.

The frame power comparator 15 ascertains if the frame power exceeds a threshold value, and as a result outputs the OVER signal 18 to the controller 16. The OVER signal 18 is OVER='1' when the frame power P(j) is greater than the threshold, and OVER='0' when the frame power P(j) is smaller than the threshold.

Figure 9:
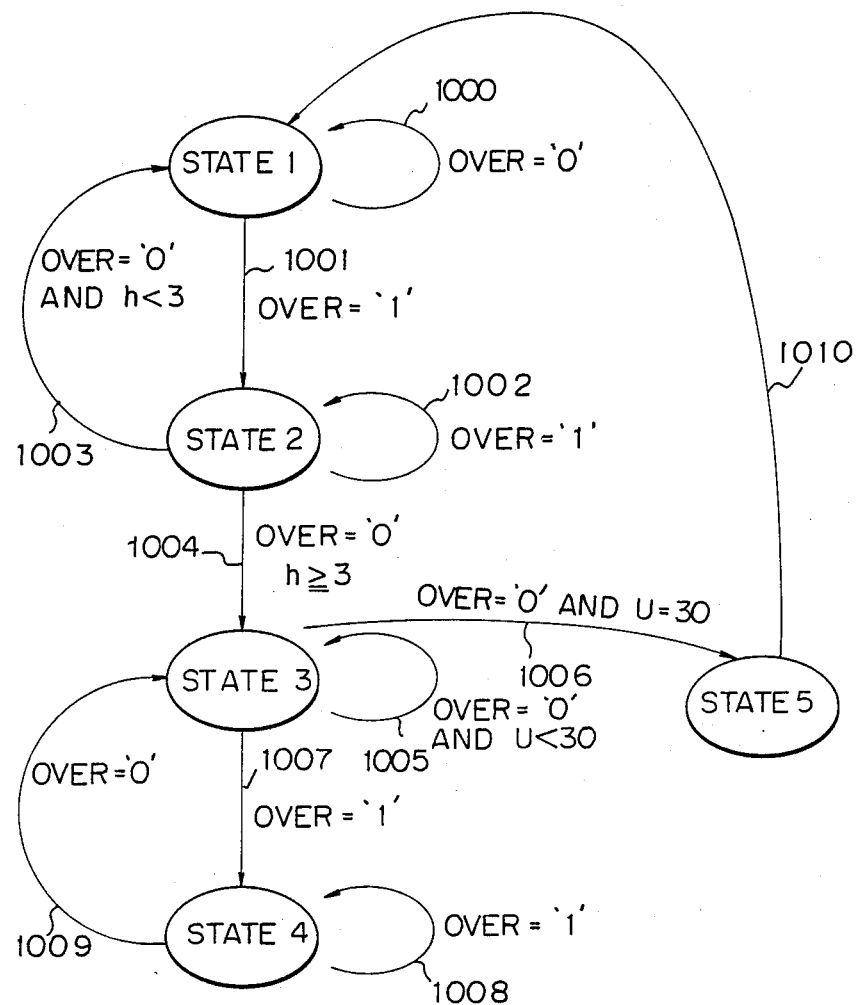
FIG. 9 is a diagram showing a transition between states of operation of a controller in the speech recognition apparatus.

After receiving the OVER signal 18 from the frame power controller 15 and the frame number signal 22 from the distance calculator and discriminator 14 the controller 16 respectively outputs the control signals 19,20,21 to the frequency analyzer 12, the spectrum normalizer 13, and the distance calculator and discriminator 14. The controller 16 operates according to state transitions with the OVER signal 18 and the frame number signal 22 used as transition conditions. FIG. 9 is a diagram of such state transitions.

The states of the controller 16 and their transitions will be described. There are five states as follows:
State 1 Initial condition
State 2 Speech sound condition
State 3 Silent condition
State 4 Speech sound after a power dip
State 5 End point detected condition (State 1—Initial condition)

This is a state immediately after the power supply of the apparatus is switched on or when the entry of a next word is awaited after the recognition of a preceding word has been completed.

(Transition 1000)

The state 1 is repeated as long as the frame power P(j) is below the threshold.

(Transition 1001)

When the frame power P(j) exceeds the threshold, a transition to the state 2 takes place. A frame in which the transition 1001 has been carried out is regarded as a start point of speech.

(State 2—Speech sound condition)

This represents that the frame power P(j) is greater than the threshold. In the state 2, the above <speech sound processing> is carried out.

(Transition 1002)

The state 2 is repeated as long as the frame power exceeds the threshold.

(Transition 1003)

If the frame power P(j) is lower than the threshold and the number (h) of frames in which the state 2 has been repeated is smaller than 3, then the process returns to the initial condition of the state 1. This processing is carried out to avoid the starting of a speech recognition process which would otherwise be initiated when the frame power P(j) exceeded the threshold due to external noise even without any speech input, resulting in a transition to the state 2 for detecting the start point of speech.

(Transition 1004)

If the frame power P(j) is lower than the threshold and the number (h) of frames in which the state 2 is repeated is 3 or larger, then the process goes from the state 2 to the state 3. The transition from the state 2 to the state 3 is a transition which is regarded as having detected a point that appears as an end point of speech. However, it is not clear if such a point is really a speech end point.

(State 3—Silent condition)

This state indicates that the frame power is smaller than the threshold. In the state 3, the foregoing <silence processing> is carried out.

(Transition 1005)

In the state 3, this transition indicates that the frame power is below the threshold, meaning "silence", in less than 30 successive frames. The state 3 is repeated.

(Transition 1006)

In the state 3, this transition indicates that the frame power is below the threshold, meaning "silence", for 30 successive frames. This transition means that the silent condition of the state 3 indicates the end point of the word, and the process goes to the state 5.

(Transition 1007)

This transition is carried out when the frame power exceeds the threshold again in the state 3. This transition indicates that the silent condition of the state 3 is caused by a power dip. The process goes to the state 4.

(State 4—speech sound condition after a power dip)

This state shows that the frame power P(j) is higher than the threshold, but differs from the state 2 in that the state 4 indicates a speech sound condition after a power dip has been detected.

In the state 4, the foregoing <speech sound processing after a power dip> is effected.

(Transition 1008)

This transition indicates that the (speech sound condition) in which the frame power P(j) exceeds the threshold is repeated.

(Transition 1009)

This transition shows that the frame power P(j) is below the threshold. The process goes from the state 4 to the state 3 (silent condition).

(State 5—end point condition)

This state is reached when the state 3 is continued for 30 frames, and indicates that the end point of the word is detected. In the state 5, the foregoing <end point processing> is effected.

(Transition 1010)

The state 5 is for only one frame. In a next frame, the process unconditionally goes to the state 1 indicating the initial condition.

Figure 10A:
FIGS. 10a through 10c are diagrams showing examples of state transitions.
Figure 10B:
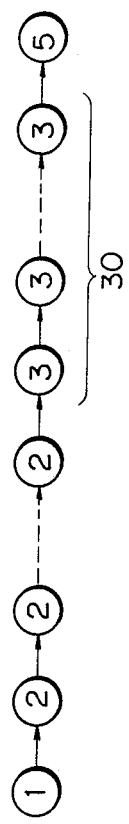
Figure 10C:
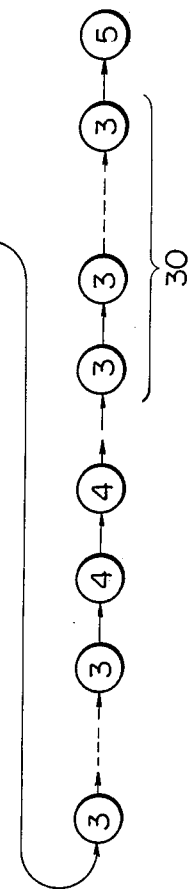

FIGS. 10a through 10c show typical examples of the above transitions.

FIG. 10a shows a case in which noise is inputted.

FIG. 10b indicates a case in which speech without a power dip is inputted.

FIG. 10c shows a case in which speech with a power dip is inputted.

The encircled numbers in FIGS. 10a through 10c correspond to the numbers of the states, as described above.

The distance calculator and discriminator 14 in the speech recognition apparatus according to the first embodiment of the present invention will be described with reference to FIG. 11.

Figure 11A:
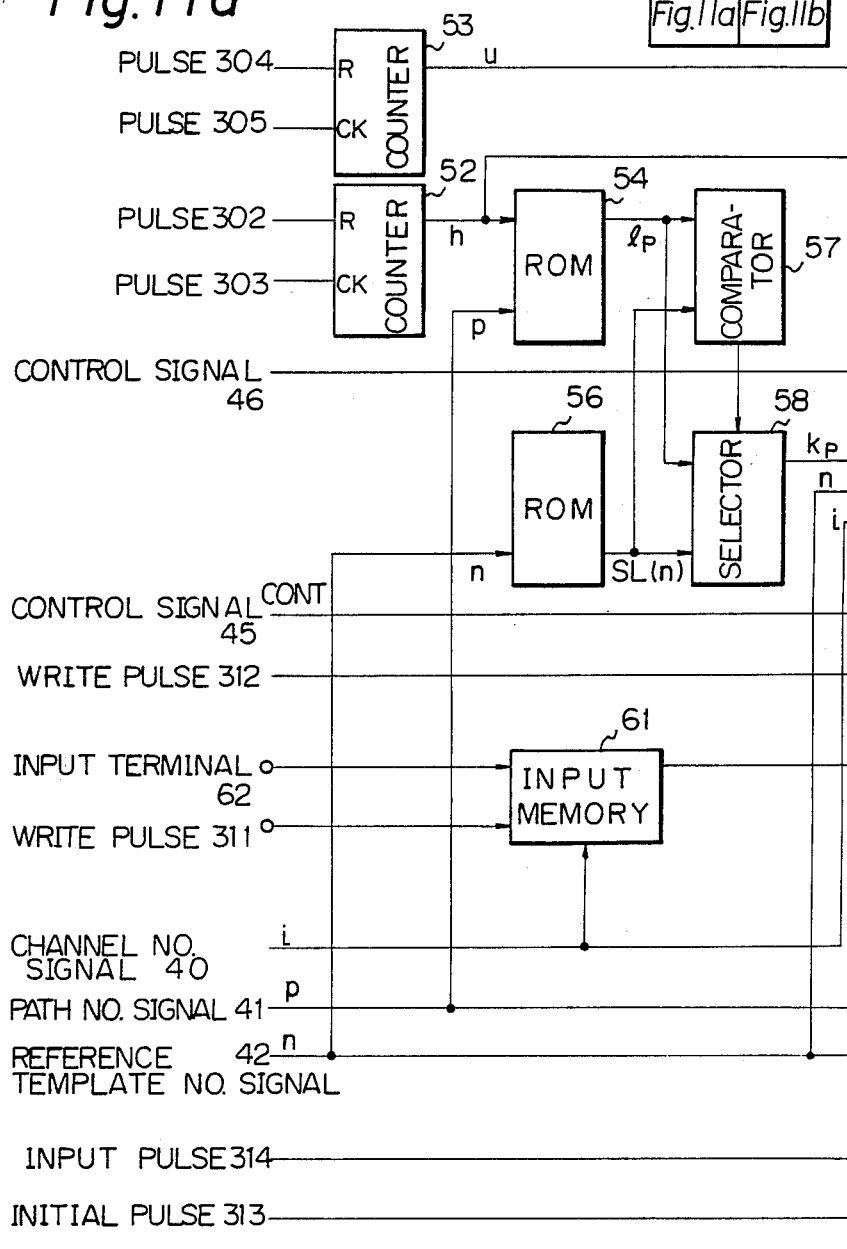
FIG. 11, consisting of FIGS. 11a and 11b, is a block diagram of a distance calculator and discriminator in the speech recognition apparatus according to the first embodiment.
Figure 11B:
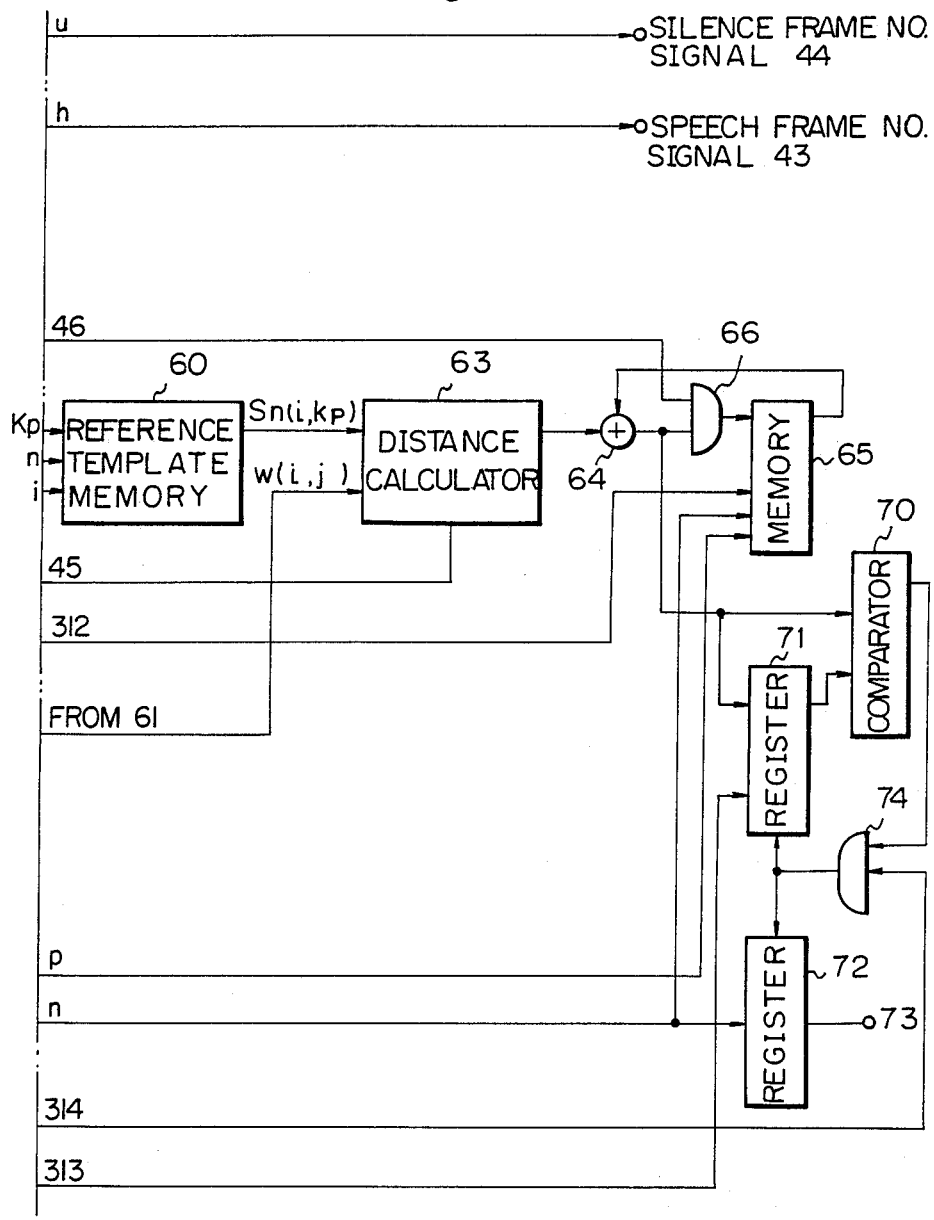

As shown in FIG. 11, a speech frame counter 52 counts a speech frame number h from a start point and outputs a speech frame number signal 43 to the controller 16 and a memory 54, described later. A silence frame counter 53 counts a silence frame number u and issues a silence frame number signal 44 to the controller 16. The memory 54 may comprise a read-only memory (ROM) for producing a path-corresponding frame number signal indicative of a path-corresponding frame number lp.

A memory 56, which may comprise a ROM, outputs a signal indicative of the length SL(n) of an nth reference template. A comparator 57 compares an output of the ROM 54 indicating the path-corresponding frame number lp with an output of the ROM 56 indicating the reference template frame length SL(n), and outputs a "1" if lp≦SL(n) and a "0" if lp>SL(n). A selector 58 selects the output of the ROM 54 when the output of the comparator 57 is "1", and selects the output of the ROM 56 when the output of the comparator 57 is "0". Thus, the comparator 57 and the selector 58 operate together to output, as a reference template frame number signal indicating a reference template frame number kp, kp= lp if lp≦SL(n), and kp=SL(n) if lp>SL(n). A reference template memory 60 is addressed by a channel number signal 40, the reference template frame number signal kp, and a reference template number signal 42 for outputting reference template data Sn(i,kp). An input memory 61 serves to store one-frame input pattern data W(i,j) which has been spectrally normalized, and is addressed by the channel number signal 40. An input terminal 62 is connected to the memory 61 and is supplied with the input pattern data W(i,j) which has been spectrally normalized by the spectrum normalizer 13 of FIG. 8.

As illustrated in FIG. 11, a distance calculator 63 is responsive to a control signal 45 (CONT) from the controller 16 (FIG. 8) for effecting the following arithmetic operation (7) on the input pattern data W(i,j) from the memory 61 and the reference template data Sn(i,kp) from the reference template memory 60:

$$\left. \begin{array}{l} \text{When CONT} = 1, |W(i,j) - Sn(i,kp)| \\ \text{When CONT} = 0, 0 \end{array} \right\} \quad (7)$$

An adder 64 adds an output from the distance calculator 63 and an output from the memory 65 to obtain dissimilarities. A memory 65 is addressed by a path number signal 41 and the reference template number signal 42 for storing the dissimilarity Dnp(j) calculated by the adder 64. An AND gate 66 serves to clear the memory 65 to 0. A comparator 70 compares the dissimilarities Dnp(j) output from the adder 64 and an output from a register 71. The register 71 stores a minimum dissimilarity from among all of the dissimilarities Dnp(j). Initially, however, the register 71 is set by an initial pulse 313 to a maximum value. A register 72 serves to store a reference template number giving the minimum dissimilarity and outputs it as a recognized result when a speech end point is detected. The recognized result is output through an output terminal 73. An AND gate 74 outputs a pulse enabling the storage of some values in the registers 71 and 72.

Figure 12B:
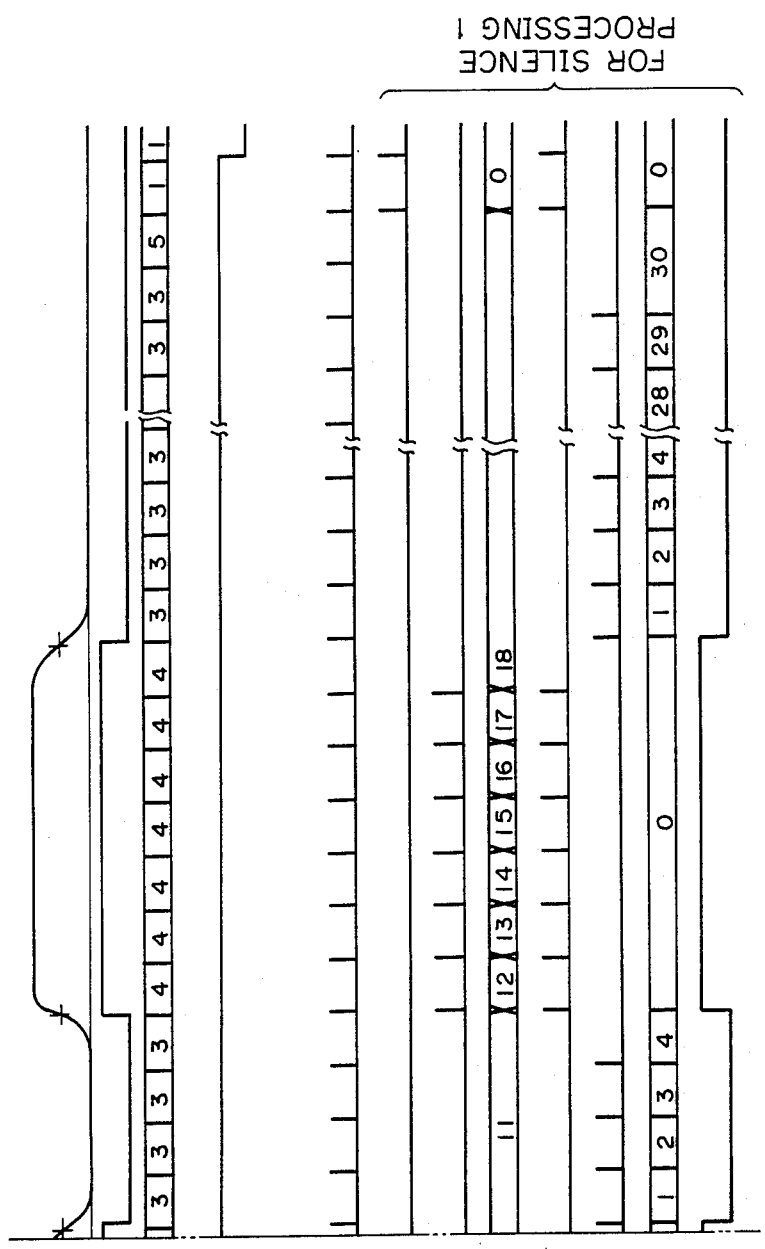
FIG. 12, consisting of FIGS. 12a and 12b, is a timing chart of signals produced in the speech recognition apparatus of the first and second embodiments, from the time when a start point of input speech has been detected to the time when an end point thereof has been detected.
Figure 13A:
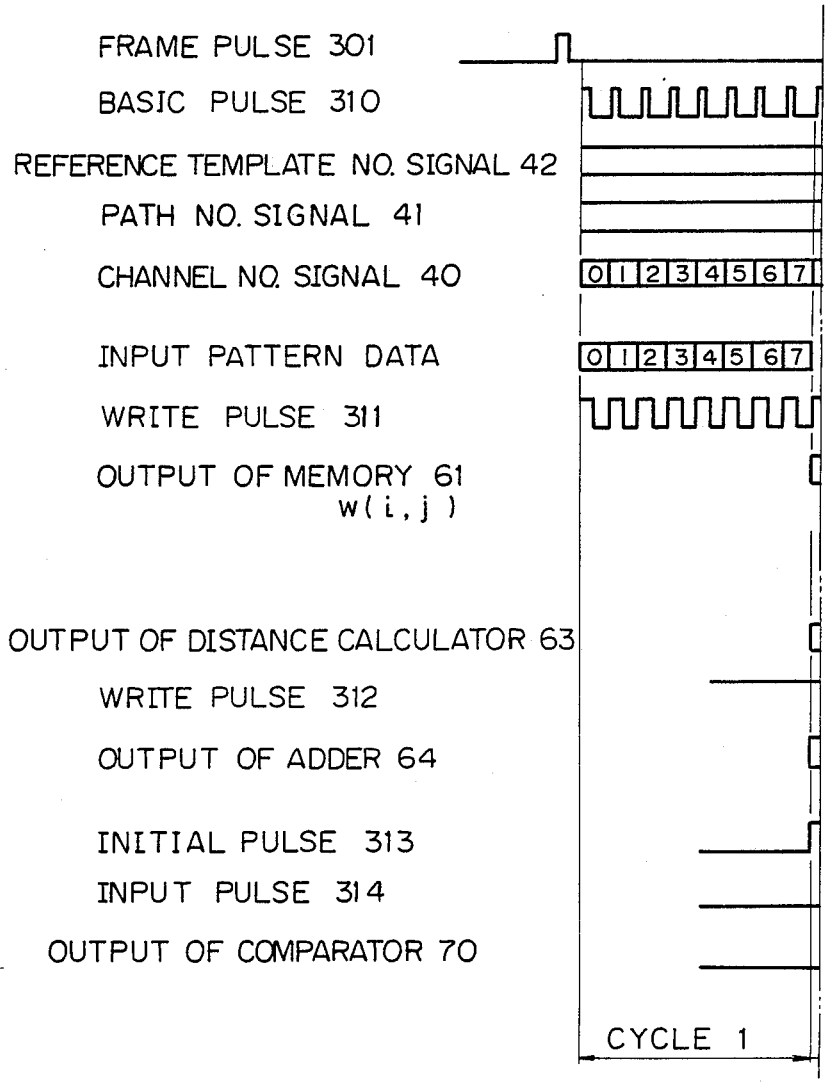
FIG. 13, consisting of FIGS. 13a, 13b, and 13c, is a timing chart of signals produced in the speech recognition apparatus of the first through third embodiments, in one frame with speech sounds.
Figure 13B:
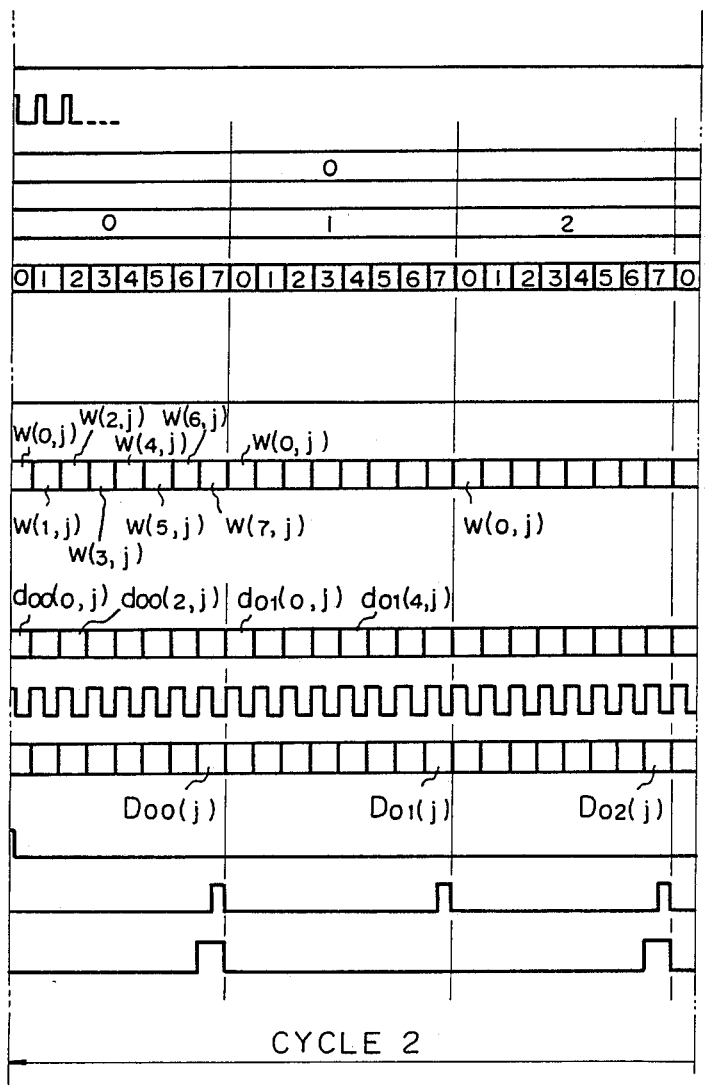
Figure 13C:
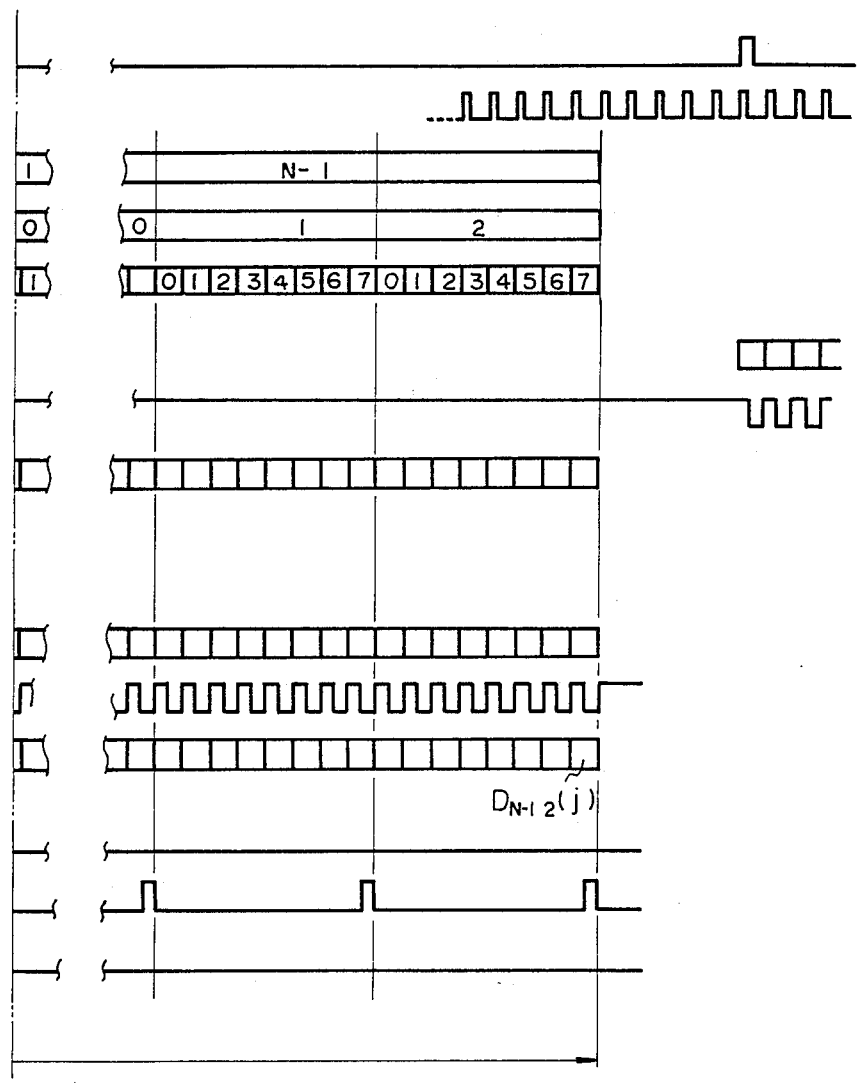

FIGS. 12 and 13 show time sequences of signals in the apparatus shown in FIGS. 8 and 11. FIG. 12 illustrates a time sequence of signals produced from the time when the start point of input speech is detected to the time when the end point thereof is detected. FIG. 13 illustrates a time sequence of signals in one frame under the speech sound condition.

The signals in FIGS. 12 and 13 will first be described. The signals 40, 41, 42 are output from the controller 16 of FIG. 8. The channel number signal 40 which indicates a channel number i cyclically varies from 0 to 7. The path number signal 41 which indicates a path number p cyclically varies from 0 to 2. The reference template number signal 42 which indicates a reference template number n varies from 0 to N−1.

The speech sound frame number signal 43 indicating the speech sound frame number h is output from the speech frame counter 52. The silence frame number signal 44 indicating the silence frame number u is output from the silence frame counter 53. The control signal 45 (CONT) for controlling the distance calculator 63 is output from the controller 16 shown in FIG. 8. A control signal 46 is output from the controller 16 for controlling the AND gate 66.

Frame pulses 301 indicative of a frame period (=16 milliseconds) are employed in the controller 16 of FIG. 8. Pulses 302 for resetting the speech sound frame counter 52 are delivered from the controller 16. Pulses 303 for counting up the speech sound frame counter 52 are delivered from the controller 16. Pulses 304 for resetting the silence frame counter 53 are delivered from the controller 16. Pulses 305 for counting up the silence frame counter 53 are delivered from the controller 16. Basic pulses 310 are employed in the controller 16 for enabling it to effect the various processes. Write pulses 311 for the input memory 61 are delivered from the controller 16. Write pulses 312 for the memory 65 are delivered from the controller 16. An initial pulse 313 for initializing the register 71 is delivered from the controller 16. Pulses 314 are delivered from the controller 16 for generating output pulses of the AND gate 74.

The operation of the distance calculator and discriminator 14 will be described with reference to FIGS. 11, 12 and 13. Since the controller 16 operate in response to each frame pulse 301 according to the state transitions of FIG. 9, the operation will be described with respect to each of the states.

[Operation in the state 1]
(Resetting of the speech sound frame counter 52 and the silence frame counter 53)

As shown in FIG. 12, the reset pulses 302 are applied to the speech sound frame counter 52 and the silence frame counter 53 to reset them.

(Initialization of dissimilarities)

Since the control signal 46 is "0", the output of the AND gate 66 is forced to be "0". At this time, the memory 65 is addressed by the path number signal 41 and the reference template number signal 42 and supplied with the write pulses 312. The memory 65 is thus cleared to 0.

[Operation in the state 2] . . . Speech sound processing

Operation in one frame under the speech sound condition is effected according to the time sequence of FIG. 13. The operation is roughly divided into two cycles, cycle 1 and cycle 2.

Cycle 1

The input data is read. In synchronism with the basic pulses 310, the channel number signal 40 varies from 0 to 7 and serves as an addressing signal for the input memory 61. At this time, the input pattern data W(i,j) is entered from the spectrum normalizer 13 of FIG. 8 via the input terminal 62 in synchronism with the basic pulses 310, and written into the input memory 61 by the write pulses 311.

Cycle 2

The distance calculation and discrimination is performed.

In synchronism with the basic pulses 310, the channel number signal 40 cyclically varies from 0 to 7. In each cycle of the channel number signal 40, the path number signal 41 cyclically varies from 0 to 2. In each cycle of the paths number signal 41, the reference template number signal 42 varies from 0 to N-1 corresponding to the number N of the reference templates.

In the cycle 2, the path-corresponding frame number lp is calculated, the reference template frame number kp is calculated, the reference template data is output, the input pattern data is output, the distance is calculated, the dissimilarity is calculated, and the discrimination is carried out.

[Calculation of the path-corresponding frame number lp]

The path-corresponding frame number lp is calculated by the ROM 54 supplied with the path number signal 41 and the speech sound frame number signal 43. The ROM 54 outputs, as the path-corresponding frame number lp, the values of [1/0.8 h], [h] and [1/1.2 h] when the path number signal p is 0, 1, and 2, respectively, h being the speech frame number indicated by the speech frame number signal 43.

[Calculation of the reference template frame number kp]

The reference template frame number kp is calculated by the ROM 56, the comparator 57, and the selector 58 in response to the path-corresponding frame number lp and the reference template number signal n applied. More specifically, the ROM 56 outputs the length SL(n) of the nth reference template. The comparator 57 compares the length SL(n) with the path-corresponding frame number lp, and applies the result of comparison to the selector 58. The selector 58 selects one of the reference template length SL(n) and the path-corresponding frame number lp and outputs the selected one as the reference template frame number kp.

Thus,

When $SL(n) \geq lp$, $kp = lp$

When $SL(n) < lp$, $kp = SL(n)$

[Output of the reference templates]

The reference templates are stored in the reference template memory 60, and the reference template data Sn(i,kp) is issued from the memory 60 in response to the reference template number signal 42, the channel number signal 40, and the reference template frame number kp.

[Output of the input data]

The content of the input memory 61 is stored in the cycle 1. The input memory 61 is addressed by the channel number signal 40 for outputting the input pattern data W(i,j).

[Distance calculation]

The distance is calculated by the distance calculator 63. The distance calculator 63 is responsive to the reference template data Sn(i,kp), the input pattern data W(i,j), and the CONT signal from the controller 16 for effecting the following arithmetic operation (8):

$$dnp(i,j) = |W(i,j) - Sn(i,kp)| \times \text{CONT} \quad (8)$$

The CONT signal is always "1" in the state 2.

[Dissimilarity calculation]

The dissimilarity Dnp(j) is calculated with respect to each reference template number n and each path number p, using the adder 64 and the memory 65. Since the memory 65 is addressed by the reference template number signal 42 and the path number signal 41, the memory 65 remains in the same address while the channel number signal 40 varies in one cycle from 0 to 7. During this time, the memory 65 is supplied with the write pulses in synchronism with the channel number signal 40. The result expressed by the following equation (9):

$$Dnp(j) = Dnp(j-1) + \sum_{i=0}^{7} dnp(i,j) \quad (9)$$

is obtained in the cycle in which the channel number signal 40 becomes "7". In the state 2, the control signal 46 remains a "1" at all times, and the AND gate 66 is open. In this manner, the dissimilarity Dnp(j) in the path p of the nth reference template is obtained in the cycle in which the channel number signal 40 for the path number signal 41 corresponding to the reference template number signal 42 is "7".

[Discrimination]

The discrimination is effected by using the dissimilarity Dnp(j) corresponding to the reference template number signal 42 and the path number signal 41. According to the first embodiment, the foregoing (discrimination processing 1) is carried out by the comparator 70, the registers 71, 72, and the AND gate 74.

The dissimilarity Dnp(j) is delivered from the adder 64 to the comparator 70 when the channel number signal 40 in the cycle 2 is "7". The register 71 stores a minimum dissimilarity Dmin. A possible maximum value is set in the register 71 by the initial pulse 313 at the start of the cycle 2.

The comparator 70 compares the output Dnp(j) from the adder 64 with the minimum dissimilarity Dmin which has been stored in the register 71 thus far. The comparator 70 outputs a "1" to the AND gate 74 if Dnp(j) < Dmin and a "0" if $Dnp(j) \geq Dmin$. The AND gate 74 is responsive to the output from the comparator 70 to pass or inhibit the input pulses 314 from the controller 16. Therefore, when the output of the comparator 70 is a "1" (when Dnp(j) < Dmin), the input pulses 314 are supplied via the AND gate 74 to the registers 71 and 72. As a consequence, the register 71 stores the dissimilarity Dnp(j) as the minimum dissimilarity at this time. The register 72 is supplied with the reference template number signal 42 corresponding to the dissimilarity Dnp(j) and stores the reference template number n. When the discrimination for all of the reference templates in one frame is completed, the reference template number giving the minimum dissimilarity Dmin up to that frame is stored in the register 72.

[Operation in the state 3] . . . Silence processing

To keep, under the silent condition, the result of the final frame under the preceding speech sound condition, the foregoing silence processing 1 is carried out in the first embodiment. In this state 3, the same operation as for the state 2 is effected except that the counting-up of the speech frame counter 52 is stopped by failing to apply the pulses 303, the pulses 304 are not applied, the pulses 305 are applied, and the control signal 45 (=CONT) applied to the distance calculator 63 is changed to "0".

Moreover, by changing the CONT signal to "0", the distance dnp(i,j) falls to 0 and the minimum dissimilarity Dmin is maintained. The result therefore remains the same irrespective of whether or not the discriminating operation is effected by the comparator 70 and the register 71. As a result, the discriminating operation may be dispensed with.

[Operation in the state 4] . . . Speech sound processing after a power dip

The operation is exactly the same as that in the state 2.

[Operation in the state 5] . . . End point processing

At the time the end point is detected, the reference template number stored in the register 72 is output as the category of the recognized result.

Figure 14A:
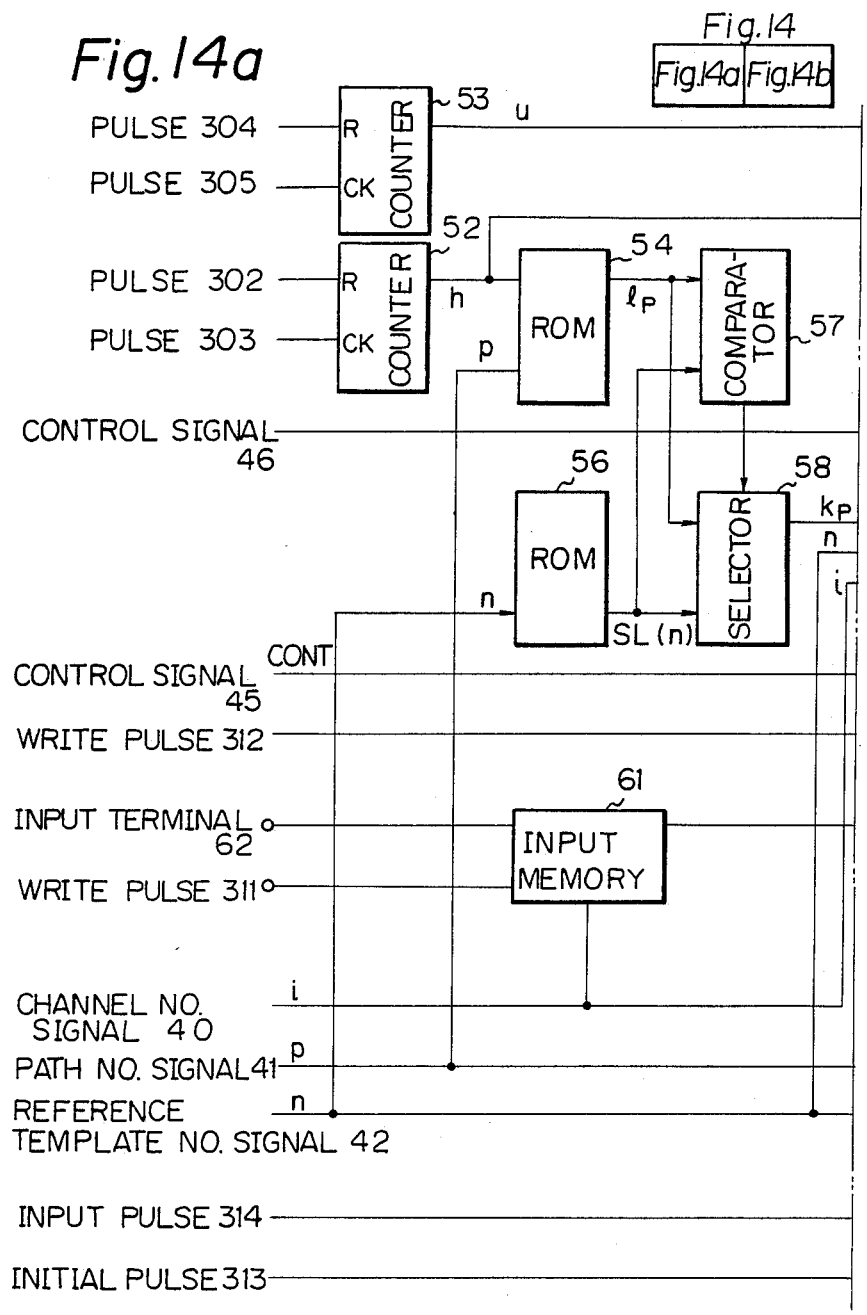
FIG. 14, consisting of FIGS. 14a and 14b, is a block diagram of a distance calculator and discriminator in the speech recognition apparatus according to the second and third embodiments.
Figure 14B:
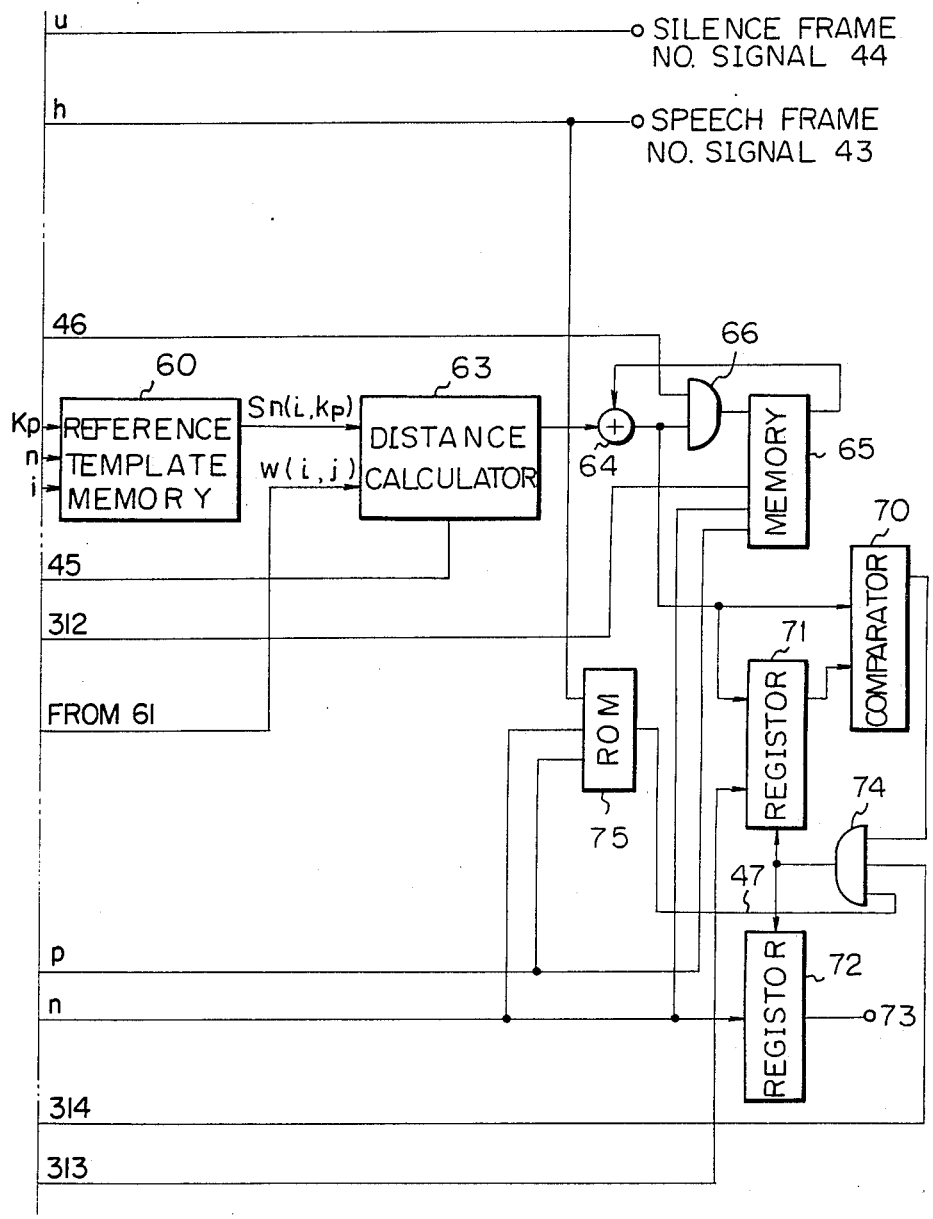

A speech recognition apparatus according to a second embodiment of the present invention is described below. The speech recognition apparatus of the second embodiment differs from that of the first embodiment only in that a distance calculator and discriminator 14 has a different arrangement from that of the first embodiment. The speech recognition apparatus of the second embodiment is therefore of the overall construction as illustrated in FIG. 8. FIG. 14 is a block diagram of the distance calculator and discriminator 14 according to the second embodiment. The distance calculator and discriminator 14 of the second embodiment shown in FIG. 14 is a combination of the distance calculator and discriminator 14 of the first embodiment and a memory 75 such as a ROM for storing information of a selected path. The ROM 75 is addressed by the speech frame number signal 43, the reference template number signal 42, and the path number signal for outputting the path selection signal 47 to the AND gate 74.

Operation of the speech recognition apparatus of the second embodiment for each of the states will be described. The signals in the speech recognition apparatus of the second embodiment have a time sequence as shown in FIGS. 12 and 13.

[Operation in the state 1]

This is the same as the [operation in the state 1] according to the first embodiment.

[Operation in the state 2]

This is substantially the same as the [operation in the state 2] according to the first embodiment except for the [discrimination processing], which will be described below.

(Discrimination)

According to the second embodiment, either the (discrimination processing 2), the (discrimination processing 3), or the (discrimination processing 4) is carried out dependent of the information stored in the ROM 75.

(For effecting the discrimination processing 2)

In order to select one path in each speech frame and for each reference template, the ROM 75 stores "1" as the path selection signal 47 only at an address specified by the speech frame number, the reference template number, and the path number of one selected path, and stores "0" at all of the other addresses. The discrimination processing 2 is performed by the comparator 70, the registers 71, 72, the AND gate 74, and the ROM 75. The dissimilarity Dnp(j) is delivered from the adder 64 to the comparator 70 when the channel number signal 40 in the cycle 2 is "7". The register 71 stores a minimum dissimilarity Dmin. A possible maximum value is set in the register 71 by the initial pulse 313 at the start of the cycle 2.

The comparator 70 compares the output Dnp(j) from the adder 64 with the minimum dissimilarity Dmin which has been stored in the register 71 thus far. The comparator 70 outputs a "1" to the AND gate 74 if Dnp(j)<Dmin and a "0" if Dnp(j)≧Dmin.

The ROM 75 is addressed by the speech frame number signal 43, the reference template number signal 42, and the path number signal 41. When the path number selected by the speech frame number h and the reference template number n is p, the ROM 75 is addressed by h, n, p and outputs a "1" as the path selection signal 47. When other signals than h, n, p are given as addressing signals, i.e., when no path is to be selected, a "0" is output as the path selection signal 47. The path selection signal 47 is supplied as one input to the AND gate 74. When the path selection signal 47 is a "1" and the output of the comparator 70 is a "1" i.e., when Dnp(j)<Dmin, the input pulses 314 are supplied through the AND gate 74 to the registers 71 and 72.

As a result, the register 71 stores the dissimilarity Dnp(j) as the minimum dissimilarity at this time. The register 72 is supplied with the reference template number signal 42 corresponding to the dissimilarity Dnp(j) and stores the reference template number n. When the discrimination for all of the reference templates in one frame is completed, the reference template number giving the minimum dissimilarity Dmin up to that frame is stored in the register 72.

(For effecting the discrimination processing 3)

In order to select one or two paths in each speech frame and for each reference template, the ROM 75 stores a "1" as the path selection signal 47 only at an address specified by the speech frame number, the reference template number, and the path number of one or two selected paths, and stores a "0" at all of the other addresses. The discrimination processing 3 is also performed by the comparator 70, the registers 71 and 72, the AND gate 74, and ROM 75. The dissimilarity Dnp(j) is delivered from the adder 64 to the comparator 70 when the channel number signal 40 in the cycle 2 is "7". The register 71 stores a minimum dissimilarity Dmin. A possible maximum value is set in the register 71 by the initial pulse 313 at the start of the cycle 2.

The comparator 70 compares the output Dnp(j) from the adder 64 with the minimum dissimilarity Dmin which has been stored in the register 71 thus far. The comparator 70 outputs a "1" to the AND gate 74 if Dnp(j)<Dmin and "0" if Dnp(j)≧Dmin.

The ROM 75 is addressed by the speech frame number signal 43, the reference template number signal 42, and the path number signal 41. When one or two path numbers selected by the speech frame number h and the reference template number n are p, the ROM 75 is addressed by h, n, p and outputs a "1" as the path selection signal 47. When signals other than h, n, p are given as addressing signals, i.e., when no path is to be selected, a "0" is output as the path selection signal 47. The path selection signal 47 is supplied as one input to the AND gate 74. When the path selection signal 47 is a "1" and the output of the comparator 70 is a "1", i.e., when Dnp(j)<Dmin, the input pulses 314 are supplied through the AND gate 74 to the registers 71 and 72.

As a result, the register 71 stores the dissimilarity Dnp(j) as the minimum dissimilarity at this time. The register 72 is supplied with the reference template number signal 42 corresponding to the dissimilarity Dnp(j) and stores the reference template number n. When the discrimination for all of the reference templates in one frame is completed, the reference template number giving the minimum dissimilarity Dmin up to that frame is stored in the register 72.

(For effecting the discrimination processing 4)

In this case, one or two paths are selected or no path is selected in each speech frame and for each reference template. Where one or two paths are selected, a "1" is stored as the path selection signal 47 in the ROM 75 at an address specified by the speech frame number, the reference template number, and the path number, and a "0" is stored in the ROM 75 at addresses specified by the path numbers other than the above path number. Where no path is selected, a "0" for inhibiting path selection is stored in the ROM 75 at addresses specified by the speech frame number, the reference template number, and all path numbers.

The discrimination processing 4 is also performed by the comparator 70, the registers 71 and 72, the AND gate 74, and the ROM 75. The dissimilarity Dnp(j) is delivered from the adder 64 to the comparator 70 when the channel number signal 40 in the cycle 2 is "7". The register 71 stores a minimum dissimilarity Dmin. A possible maximum value is set in the register 71 by the initial pulse 313 at the start of the cycle 2.

The comparator 70 compares the output Dnp(j) from the adder 64 with the minimum dissimilarity Dmin which has been stored in the register 71 thus far. The comparator 70 outputs a "1" to the AND gate 74 if Dnp(j)<Dmin and a "0" if Dnp(j)≧Dmin.

The ROM 75 is addressed by the speech frame number signal 43, the reference template number signal 42, and the path number signal 41. When the path number selected by the speech frame number h and the reference template number n is p, the ROM 75 is addressed by h, n, p and outputs a "1" as the path selection signal 47. When signals other than h, n, p are given as addressing signals, i.e., when no path is to be selected, a "0" is output as the path selection signal 47. The path selection signal 47 is supplied as one input to the AND gate 74. When the path selection signal 47 is a "1" and the output of the comparator 70 is a "1", i.e., when Dnp(j)<D-min, the input pulses 314 are supplied through the AND gate 74 to the registers 71 and 72.

As a result, the register 71 stores the dissimilarity Dnp(j) as the minimum dissimilarity at this time. The register 72 is supplied with the reference template number signal 42 corresponding to the dissimilarity Dnp(j) and stores the reference template number n. When the discrimination for all of the reference templates in one frame is completed, the reference template number giving the minimum dissimilarity Dmin up to that frame is stored in the register 72.

[Operation in the state 3]

For the discriminating operation, either one of the foregoing discrimination processing 2 through 4 is carried out. For the other operations, the silence processing 1 is effected as with the [operation in the state 3] according to the first embodiment.

[Operation in the state 4]

This is the same as the [operation in the state 2].

[Operation in the state 5]

At the time when the end point is detected, the reference template number stored in the register 72 is only output as the category of the recognized result.

A speech recognition apparatus according to a third embodiment of the present invention is described below. The speech recognition apparatus of the third embodiment has the same circuit arrangement as that of the speech recognition apparatus according to the second embodiment, and hence is shown in the block diagram of FIGS. 8 and 14. The time sequence of signals in one frame under the speech sound condition is as shown in FIG. 13. FIG. 15 is illustrative of a time sequence of signals produced in the speech recognition apparatus of the third embodiment from the time when the start point of input speech is detected to the time when the end point thereof is detected. The third embodiment differs from the second embodiment as to the [Operation in the state 3], i.e., the silence processing.

Operation of the speech recognition apparatus of the third embodiment is as follows:

[Operation in the state 1]

This is the same as the [operation in the state 1] according to the first and second embodiments.

[Operation in the state 2]

This is the same as the [operation in the state 2] according to the second embodiment.

[Operation in the state 3]

According to the third embodiment, when a silent condition is detected, either the (silence processing 2) or the (silence processing 3) as described above is carried out.

(For effecting the silence processing 2)

The pulses 305 are supplied to the silence frame counter 53 to count up the silence frames. The reset pulses 304 are not supplied to the silence frame counter 53. By stopping the discriminating operation in the processing in the state 2, only the discriminated result is held while continuing the dissimilarity calculation. The processing other than that described above is the same as the processing in the state 2.

(For effecting the silence processing 3)

The discriminated result is stored in another register (not shown), and the discrimination processing is continued.

[Operation in the state 4]

This is the same as the [operation in the state 2].

[Operation in the state 5]

At the time when the end point is detected, the reference template number stored in the register 72 is only issued out as the category of the recognized result.

While in the first and second embodiments the discrimination processing is performed each time the speech frame is updated under the speech sound condition, the discrimination processing may not be effected under the speech sound condition, but may be started only under the silent condition, as described below according to a fourth embodiment of the present invention.

According to the fourth embodiment, the circuit arrangement is the same as that of the first or second embodiment, and the operation is substantially the same as that of the first or second embodiment except for the (discrimination processing).

In the fourth embodiment, the distance dnp(i,j) is cleared to 0 under the silent condition to thereby hold the dissimilarities Dnp(j). Therefore, the dissimilarities under the silent condition are equal to those in the final frame under the speech sound condition. Unless a speech sound condition subsequently occurs, a discriminated result obtained by detecting a minimum dissimilarity out of the above dissimilarities will be output as a recognized result. Therefore, the discrimination processing is required only under the silent condition, and that of the speech sound processing is unnecessary.

As described above, the present invention is advantageous in that the recognized result is output within one frame after the end point of speech has been detected since the distance and dissimilarities are calculated in each input frame. For calculating the dissimilarities, only the dissimilarities with respect to the preceding input frame and the distance with respect to the present input frame are required to be accumulated, and hence it is not necessary to store input data from the start point to the end point.

Since the circuit arrangement is simple, it can easily be fabricated as an LSI, and an inexpensive speech recognition LSI chip with a small number of gates can be supplied. The speech recognition process of the invention can also be implemented by a software approach on a general-purpose microprocessor.

From the foregoing, it will now be apparent that a new and improved apparatus and method for recognizing speech has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An apparatus for recognizing speech, comprising:
   a means for frequency analyzing an input speech periodically at each input frame, which is a predetermined time interval, for extracting an input pattern composed of time series information of frequency components in a plurality of channels;

a means for spectrally normalizing said components of said input pattern in each of the channels in each frame to generate spectrally normalized data W(i,j);

a means for detecting start and end points and a speech sound condition of the input speech based on said spectrally normalized data; and a distance calculating and discriminating means comprising:

a reference template memory for storing a plurality of reference templates composed of spectrally normalized data Sn(i,kp) in plural frames and plural channels which are produced by frequency analyzing and spectrally normalizing a plurality of predetermined reference speech samples;

an input pattern memory for storing the spectrally normalized data W(i,j) in all of the channels for one frame of the input pattern, output from said spectrally normalizing means;

a means for starting counting of a speech frame number j of the input pattern after the start point of the input speech has been detected;

a means for updating said speech frame number j every input frame while the input speech is in the speech sound condition;

a means for holding said speech frame number j while the input speech is in a silent condition;

a means for restarting to update said speech frame number j every input frame when the input speech is again in the speech sound condition before the end point of the input speech is detected;

a means for setting plural substantially linear matching paths, each having different slopes, between said input pattern and said reference templates by generating plural path-related frame numbers lp, each of which is related to each of said matching paths, in substantially a linear relationship to said speech frame number j according to the equation $$lp = \left[\frac{j}{C_p}\right],$$

where the denominators $C_p$ are plural positive real constants each of which is predetermined with respect to each of said matching paths and [] represents a Gaussian symbol, each time said speech frame number j is updated;

a means for generating plural reference template frame numbers kp, each of which is related to each of said matching paths, based on said path-related frame numbers lp and the frame length SL(n) of each reference template each time said speech frame number j is updated, according to the following equation;

$kp = lp$ (if $lp \leq SL(n)$)

$SL(n)$ (if $lp > SL(n)$)

a means for calculating the distance between the spectrally normalized data W(i,j) of said speech frame number j of said input pattern and the spectrally normalized data Sn(i,kp) of said reference template frame number kp of each reference template in each matching path each time said speech frame number j is updated;

a means for calculating a dissimilarity relating to each of the matching paths for each of the reference templates by accumulating said distances each time said speech frame number j is updated;

a means for detecting a minimum dissimilarity each time said speech frame number j is updated and storing the number of the reference template corresponding to said minimum dissimilarity; and a means for determining the number of said reference template relating to said minimum dissimilarity stored at the speech frame corresponding to the end point of the input speech as the recognized result of the input speech when said end point is detected.

2. An apparatus according to claim 1, wherein said means for detecting a minimum dissimilarity and storing the number of the corresponding reference template updates and stores the number of the reference template corresponding to the minimum dissimilarity each time said speech frame is updated; and the number of said matching paths for each of said reference templates is 3.

3. An apparatus according to claim 2, wherein said distance calculating and discriminating means includes:

a means for storing path selection information to specify one of said matching paths at an address specified by each of said speech frame numbers and the number of each said reference templates, and for outputting one of said path selection information to select one of said dissimilarities corresponding to each of said reference templates each time said speech frame number is updated; and said means for detecting a minimum dissimilarity and storing the number of the corresponding reference template, selects dissimilarities out of all of said dissimilarities which correspond to said path selection information, and detects the minimum dissimilarity out of said selected dissimilarities, and updates and stores the number of the reference template correpsonding to said detected minimum dissimilarity, each time said speech frame number is updated.

4. An apparatus according to claim 2, wherein said distance calculating and discriminating means further comprises:

a means for storing path selection information to specify one or two of said matching paths at an address specified by each of said speech frame numbers and the number of each said reference templates, and for outputting one or two of said path selection information to select one or two of said dissimilarities corresponding to each of said reference templates each time said speech frame number is updated; and said means for detecting a minimum dissimilarity and storing the number of the corresponding reference template, selects dissimilarities out of all of said dissimilarities which correspond to said path selection information, and detects the minimum dissimilarity out of said selected dissimilarities, and updates and stores the number of the reference template corresponding to said detected minimum dissimilarity, each time said speech frame number is updated.

5. An apparatus according to claim 2, wherein said distance calculating and discriminating means further comprises:

a means for storing one or two of path selection information to select one or two of said dissimilarities at an address specified by said speech frame number and the number of said reference template, if said speech frame number is in a predetermined interval to be discriminated of a desired one of said reference templates, said interval being provided for each of said reference templates to indicate an area containing many pronounced lengths of words of the category of the reference templates in their distribution, and for storing information not to select any path at an address specified by said speech frame number and the number of said reference template, if said speech frame number is outside of said predetermined interval to be discriminated of a desired one of said reference templates, and for outputting said one or two of said path selection information or the information not to select any path, dependent on the reference template, each time said speech frame number is updated; and said means for detecting a minimum dissimilarity and storing the number of the corresponding reference template, stops the detection of the minimum dissimilarity under the silent condition.

6. An apparatus according to claim 2, wherein said means for updating a speech frame number continues to update said speech frame number even in the silent condition after the start point of the input speech has been detected until the end point thereof is detected; and said means for detecting a minimum dissimilarity and storing the number of the corresponding reference template, stops the detection of the minimum dissimilarity under the silent condition.

7. An apparatus according to claim 1, wherein said means for detecting a minimum dissimilarity and storing the number of the corresponding reference template, starts to detect the minimum dissimilarity by detecting a substantially silent condition; and the number of said matching paths for each of said reference templates is 3.

8. A method of recognizing speech, comprising the steps of:

providing a plurality of reference templates composed of spectrally normalized data in a plurality of frames and a plurality of channels;

analyzing the frequencies of an input speech periodically at each input frame, which is a predetermined time interval, to extract an input pattern composed of time series information of frequency components in a plurality of channels;

spectrally normalizing said components of said input pattern in each of the channels in each frame to generate spectrally normalized data;

starting counting of a speech frame number j of the input pattern after a start point of the input speech is detected;

updating said speech frame number j every input frame while the input speech is in the speech sound condition;

holding said speech frame number j while the input speech is in a silent condition;

restarting to update said speech frame number j every input frame when the input speech is again in the speech sound condition before the end point of the input speech is detected;

setting plural substantially linear matching paths, cash having different slopes, between said input pattern and said reference templates by generating plural path-related frame numbers lp, each of which is related to each of said matching paths, in substantially a linear relationship to said speech frame number j according to the equation $$lp = \left[ \frac{j}{C_p} \right],$$

where the denominators $C_p$ are plural positive real constants each of which is predetermined with respect to each of said matching paths and where [] represents a Gaussian symbol, each time said speech frame number j is updated;

generating plural reference template frame numbers kp, each of which is related to each of said matching paths, based on said path-related frame number lp and the frame length SL(n) of each reference template each time said speech frame number j is updated, according to the following equation;

$kp = lp$ (if $lp \leq SL(n)$)

$SL(n)$ (if $lp > (SL(n))$)

calculating the distance between the spectrally normalized data W(i,j) of said speech frame number j of said input pattern and the spectrally normalized data Sn(i,kp) of said reference template frame number kp of each reference template in each matching path each time said speech frame number j is updated;

calculating a dissimilarity relating to each of the matching paths for each of the reference templates by accumulating said distances each time said speech frame number j is updated;

detecting a minimum dissimilarity each time said speech frame number j is updated and storing the number of the reference template corresponding to said minimum dissimilarity; and determining the number of said reference template relating to said minimum dissimilarity stored correspondingly to the speech frame number at the end point of the input speech as the recognized result of the input speech when said end point is detected.

9. A method according to claim 8, wherein said detecting a minimum dissimilarity and storing the number of the corresponding reference template updates and stores the number of the reference template corresponding to the minimum dissimilarity each time said speech frame number is updated; and the number of said matching paths for each of said reference templates is 3.

10. A method according to claim 9, further including the steps of:

providing path selection information to specify one of said matching paths corresponding to said speech frame number and the number of each said reference template;

generating one of said path selection information to select one of said dissimilarities corresponding to each said reference template each time said speech frame number is updated; and said detecting a minimum dissimilarity and storing the number of the corresponding reference template, detects a minimum dissimilarity out of the dissimilarities which correspond to said path selection information in each said reference template, and updates and stores the number of the reference template corresponding to said detected minimum dissimilarity each time said speech frame number is updated.

11. A method according to claim 9, further including the steps of:

providing path selection information to specify one or two of said matching paths corresponding to said speech frame number and the number of each said reference template;

generating one or two of said path selection information corresponding to each said reference template each time said speech frame number is updated; and said step of detecting a minimum dissimilarity and storing the number of the corresponding reference template, detects a minimum dissimilarity out of the dissimilarities which correspond to said path selection information in each said reference template, and updates and stores the number of the reference template corresponding to said detected minimum dissimilarity each time said speech frame number is updated.

12. A method according to claim 9, further including the steps of:

providing path selection information to specify one or two of said matching paths corresponding to said speech frame number and the number of said reference template, only if said speech frame number is in a predetermined interval to be discriminated of a desired one of said reference templates, said interval being provided for each of said reference templates to indicate an area containing many pronounced lengths of words of the category of the reference templates in their distribution;

generating selectively one or two of said path selection information, dependent on the reference template, each time said speech frame is updated; and said step of detecting a minimum dissimilarity and storing the number of the corresponding reference template, updates and stores the number of the reference template corresponding to a minimum dissimilarity out of the dissimilarities corresponding to said path selection information in each said reference template, each time said speech frame number is updated.

13. A method according to claim 8, wherein said detecting a minimum dissimilarity and storing the number of the corresponding reference template, starts to detect the minimum dissimilarity by detecting a substantially silent condition; and the number of said matching paths for each of said reference templates is 3.

14. An method according to claim 8, wherein said counting up of a speech frame number continues to update said speech frame number even in the silent condition after the start point of the input speech has been detected until the end point thereof is detected; and said detecting a minimum dissimilarity and storing the number of the corresponding reference template, stops the detection of the minimum dissimilarity under the silent condition.

* * * * *